United States Patent
Lee et al.

(10) Patent No.: US 9,489,163 B2
(45) Date of Patent: Nov. 8, 2016

(54) SYSTEM AND METHOD TO PROVIDE MOBILE PRINTING USING NEAR FIELD COMMUNICATION

(71) Applicant: Samsung Electronics Co., Ltd, Suwon-si, Gyeonggi-do (KR)

(72) Inventors: Hak-ju Lee, Suwon-si (KR); Wu-seok Jang, Seoul (KR); Naveen Maheshwari, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/249,545

(22) Filed: Apr. 10, 2014

(65) Prior Publication Data
US 2014/0355047 A1    Dec. 4, 2014

(30) Foreign Application Priority Data
Jun. 3, 2013  (KR) .................. 10-2013-0063701

(51) Int. Cl.
*G06F 3/12* (2006.01)

(52) U.S. Cl.
CPC ............ *G06F 3/1292* (2013.01); *G06F 3/123* (2013.01); *G06F 3/1204* (2013.01); *G06F 3/1236* (2013.01); *G06F 3/1268* (2013.01); *G06F 3/1271* (2013.01)

(58) Field of Classification Search
None
See application file for complete search history.

(56) References Cited

U.S. PATENT DOCUMENTS

| | | | |
|---|---|---|---|
| 9,143,402 B2 * | 9/2015 | Tinnakornsri-suphap | H04L 41/0809 |
| 2005/0243369 A1 * | 11/2005 | Goldstein et al. | 358/1.18 |
| 2007/0135866 A1 * | 6/2007 | Baker et al. | 607/60 |
| 2011/0275316 A1 * | 11/2011 | Suumaki et al. | 455/41.1 |
| 2012/0100803 A1 * | 4/2012 | Suumaki et al. | 455/41.1 |
| 2012/0158839 A1 * | 6/2012 | Hassan et al. | 709/204 |
| 2012/0262749 A1 * | 10/2012 | Yamamoto | H04N 1/00244 358/1.14 |
| 2012/0322411 A1 | 12/2012 | Lazarev et al. | |
| 2013/0036231 A1 * | 2/2013 | Suumaki | 709/228 |
| 2013/0044635 A1 * | 2/2013 | Suzuki | 370/254 |
| 2013/0057897 A1 * | 3/2013 | Park et al. | 358/1.14 |
| 2013/0057898 A1 * | 3/2013 | Park et al. | 358/1.14 |
| 2013/0057908 A1 * | 3/2013 | Park | 358/1.15 |
| 2013/0057912 A1 * | 3/2013 | Park | 358/1.15 |
| 2013/0057913 A1 * | 3/2013 | Park | 358/1.15 |
| 2013/0128311 A1 * | 5/2013 | Kim et al. | 358/1.15 |
| 2013/0148149 A1 * | 6/2013 | Park et al. | 358/1.13 |
| 2013/0148161 A1 * | 6/2013 | Park et al. | 358/1.15 |

(Continued)

OTHER PUBLICATIONS

Wi-Fi Alliance, Wi-Fi Peer-to-Peer (P2P) Technical Specification, Version 1.2.*

*Primary Examiner* — Nicholas Pachol
(74) *Attorney, Agent, or Firm* — Jefferson IP Law, LLP

(57) ABSTRACT

A method of mobile printing using near field communication (NFC) includes checking a version of firmware installed in an image forming apparatus; determining whether the checked version of the firmware supports Wi-Fi Direct connection via automatic transmission of a personal identification number (PIN); updating the firmware installed in the image forming apparatus when the checked version of the firmware does not support Wi-Fi Direct connection via automatic transmission of a PIN; encrypting and storing a PIN in an NFC tag attached to the image forming apparatus; setting a Wi-Fi Direct connection by receiving the stored PIN and automatically transmitting the PIN to the image forming apparatus by the mobile device when the mobile device is NFC-tagged to the image forming apparatus; and performing mobile printing via the Wi-Fi Direct connection.

23 Claims, 27 Drawing Sheets

(56) References Cited

U.S. PATENT DOCUMENTS

| | | | |
|---|---|---|---|
| 2013/0148162 A1* | 6/2013 | Park et al. .................. 358/1.15 |
| 2013/0223279 A1* | 8/2013 | Tinnakornsri-suphap ................ H04L 41/0809 370/254 |
| 2013/0260682 A1* | 10/2013 | Suzuki et al. ............... 455/41.1 |
| 2013/0260683 A1* | 10/2013 | Suzuki et al. ............... 455/41.1 |
| 2013/0260818 A1* | 10/2013 | Suzuki et al. ............. 455/552.1 |
| 2013/0309971 A1* | 11/2013 | Kiukkonen et al. ......... 455/41.2 |
| 2014/0006161 A1* | 1/2014 | Jabara ................ G06Q 30/0267 705/14.57 |
| 2014/0075523 A1* | 3/2014 | Tuomaala et al. ................. 726/6 |
| 2014/0163751 A1* | 6/2014 | Davis et al. .................. 700/286 |
| 2014/0173082 A1* | 6/2014 | Shin .............................. 709/223 |
| 2014/0179229 A1* | 6/2014 | Lin ............................... 455/41.2 |
| 2014/0188463 A1* | 7/2014 | Noh et al. ..................... 704/201 |
| 2014/0196112 A1* | 7/2014 | Huang et al. ..................... 726/3 |
| 2014/0206285 A1* | 7/2014 | Jance et al. .................. 455/41.2 |
| 2014/0240776 A1* | 8/2014 | Suzuki et al. ............... 358/1.15 |
| 2014/0355048 A1* | 12/2014 | Kang et al. ................. 358/1.15 |
| 2014/0355057 A1* | 12/2014 | Jang et al. .................. 358/1.15 |
| 2014/0357269 A1* | 12/2014 | Zhou ..................... H04W 8/005 455/434 |

* cited by examiner

SYSTEM AND METHOD TO PROVIDE MOBILE PRINTING USING NEAR FIELD COMMUNICATION

CROSS-REFERENCE TO RELATED APPLICATIONS

This application claims the benefit of Korean Patent Application No. 10-2013-0063701, filed on Jun. 3, 2013, in the Korean Intellectual Property Office, the disclosure of which is incorporated herein in its entirety by reference.

BACKGROUND OF THE INVENTION

1. Field of the Invention

The present general inventive concept relates to a system and method to provide mobile printing using near field communication (NFC).

2. Description of the Related Art

As mobile communication technologies are developed and mobile communication devices have become popularized, mobile devices such as smartphones, tablet personal computers (PCs), and personal digital assistances (PDAs) have begun to replace existing PCs. In the field of image forming apparatuses such as printers, scanners, faxes, copying machines, and multifunction printers (MFPs), research is currently being conducted relating to a technology allowing a mobile device to directly use an image forming apparatus without accessing a PC.

Specifically, in order to overcome interface restrictions of mobile devices and to ensure mobility, wireless communication is preferred between an image forming apparatus and a mobile device. However, a typical wireless connection process is complicated, is inconvenient, and demands users to have preliminary knowledge of a wireless network.

In addition, since a mobile application provided on a mobile device to use an image forming apparatus uses an environment different from an existing PC environment, a user who is not used to manipulating the mobile application may find it difficult to use the image forming apparatus.

SUMMARY OF THE INVENTION

The present general inventive concept provides a system and method to allow a user to conveniently and easily perform mobile printing by using near field communication (NFC).

Additional features and utilities of the present general inventive concept will be set forth in part in the description which follows and, in part, will be obvious from the description, or may be learned by practice of the general inventive concept.

Exemplary embodiments of the present general inventive concept provide a method of mobile printing using near field communication (NFC), the method including checking a version of firmware installed in an image forming apparatus; determining whether the checked version of the firmware supports Wi-Fi Direct connection via automatic transmission of a personal identification number (PIN); updating the firmware installed in the image forming apparatus when the checked version of the firmware does not support Wi-Fi Direct connection via automatic transmission of a PIN; encrypting and storing a PIN in an NFC tag attached to the image forming apparatus; setting a Wi-Fi Direct connection by receiving the stored PIN and automatically transmitting the PIN to the image forming apparatus by the mobile device when the mobile device is NFC-tagged to the image forming apparatus; and performing mobile printing via the Wi-Fi Direct connection.

Exemplary embodiments of the present general inventive concept also provide a system to provide mobile printing using near field communication (NFC), the system including a mobile device including an NFC module; and an image forming apparatus to set a Wi-Fi Direct connection to the mobile device via NFC tagging so as to perform mobile printing; and a server to provide a firmware update file for firmware installed in the image forming apparatus, wherein, if a version of the firmware installed in the image forming apparatus does not support Wi-Fi Direct connection via automatic transmission of a personal identification number (PIN), the firmware of the image forming apparatus is updated by using the firmware update file provided by the server, and a PIN is encrypted and stored in an NFC tag attached to the image forming apparatus.

Exemplary embodiments of the present general inventive concept also provide a system to provide mobile printing using near field communication (NFC), the system comprising: a mobile device comprising an NFC module; and a multi-function peripheral (MFP) device including an MFP tag to set a Wi-Fi Direct connection to the mobile device via NFC tagging so as to perform mobile printing; wherein when the mobile device is NFC tagged, the mobile device receives information about the MFP from the MFP tag, searches for a device having information identical to the received information from the NFC tag, and if the MFP to which the NFC tag is attached is found, attempts to set a Wi-Fi Direct connection to the found MFP.

Exemplary embodiments of the present general inventive concept also provide a mobile device usable in a mobile printing system, the device comprising: an NFC module to provide short distance wireless communication to and receive information about a multi-function peripheral (MFP) when approaching an NFC tag of the MFP; a Wi-Fi Direct interface unit to set a Wi-Fi Direct connection with the MFP and to transmit and receive data and a command for mobile printing; a user interface unit to display a screen to a user and to receive various inputs from the user including the command for mobile printing; and a control unit to allow the Wi-Fi connection to the MFP based on the information about the MFP received by the NFC module, and to allow a mobile printing application to be executed.

Exemplary embodiments of the present general inventive concept also provide a method of mobile printing using near field communication (NFC), the method comprising: updating firmware installed in a multi-function peripheral (MFP) and storing a PIN in an NFC tag of the MFP when it is determined that the version of the firmware does not support Wi-Fi Direct connection via automatic transmission of a PIN; receiving information about the MFP including the stored PIN by NFC tagging the MFP; and requesting the MFP for Wi-fi Direct connection and transmitting the PIN received from the MFP during an NFC tagging operation to the MFP.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
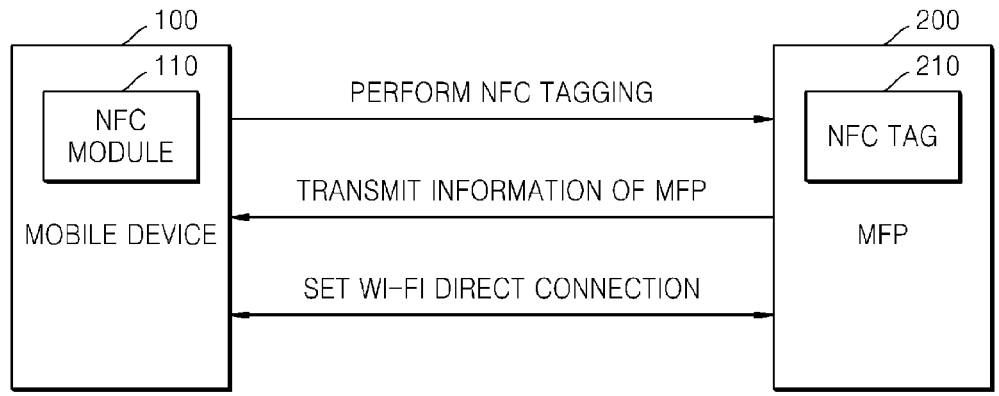
FIG. 1 is a diagram showing a system to provide mobile printing using near field communication (NFC), according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Initially, a technology to provide mobile printing using near field communication (NFC) will be described.

Basically, when a mobile device having an NFC module approaches a multifunction printer (MFP) and performs NFC tagging for short-distance wireless communication, the mobile device obtains information of the MFP and sets a wireless connection for data transmission and reception to the MFP by using the obtained information. In this case, the wireless connection for data transmission and reception between the mobile device and the MFP may be set by using, for example, Bluetooth, Wi-Fi, or Wi-Fi Direct. In the following description, it is assumed that Wi-Fi Direct is used. If a Wi-Fi Direct connection is set between the mobile device and the MFP, the mobile device transmits to the MFP via the Wi-Fi Direct connection an image data file or a command to perform an operation, and the MFP performs an image forming operation according to the received command. In this case, besides the MFP, various image forming apparatuses such as a printer, a scanner, and a fax machine may also be used. However, it is assumed hereinafter that an MFP is used.

FIG. 1 is a diagram showing a system to provide mobile printing using NFC, according to an embodiment of the present general inventive concept. A mobile device 100 includes an NFC module 110, and an MFP 200 includes an NFC tag 210. In general, for cost reduction, the MFP 200 includes the NFC tag 210 that supports passive NFC. In this case, the NFC tag 210 stores information about the MFP 200, for example, a media access control (MAC) address and a device name of the MFP 200. Since passive NFC allows only reading of information stored in the NFC tag 210, if NFC tagging is performed, the mobile device 100 receives the information of the MFP 200, which is stored in the NFC tag 210 of the MFP 200, and sets a Wi-Fi Direct connection for data communication to the MFP 200 by using the received information about the MFP 200.

Figure 2:
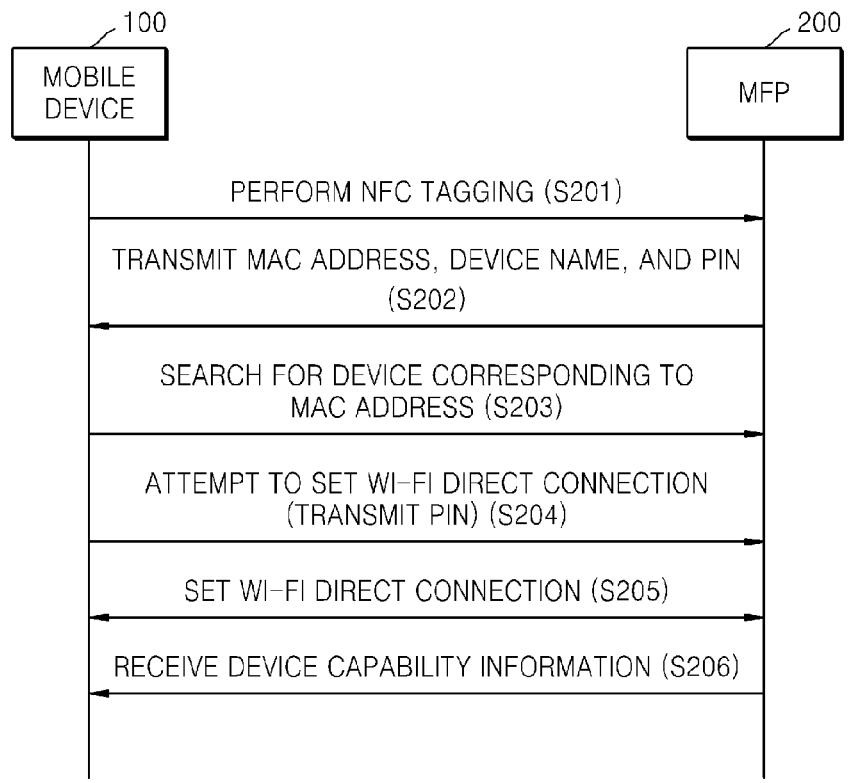
FIG. 2 is a diagram showing a detailed process of setting a Wi-Fi Direct connection between a mobile device and a multifunction printer (MFP) via NFC tagging, according to an embodiment of the present general inventive concept.

FIG. 2 is a diagram showing a detailed process of setting a Wi-Fi Direct connection between a mobile device 100 and an MFP 200 via NFC tagging, according to an embodiment of the present general inventive concept. If the mobile device 100 is NFC-tagged on the MFP 200 (operation S201), the mobile device 100 receives a MAC address, a device name, and a personal identification number (PIN) of the MFP 200 from an NFC tag attached to the MFP 200 (operation S202). The mobile device 100 searches for a device having a MAC address identical to the MAC address received from the NFC tag (operation S203). If the MFP 200 to which the NFC tag is attached is found, the mobile device 100 attempts to set a Wi-Fi Direct connection to the found MFP 200 (operation S204).

In this case, according to the Wi-Fi Direct standards, the Wi-Fi Direct connection may be set if a user presses a Wi-Fi Protected Setup (WPS) button included in the MFP 200, or inputs a PIN via an input interface of the MFP 200. Alternatively, the Wi-Fi Direct connection may be automatically set even if a user neither presses a WPS button nor inputs a PIN.

In more detail, if a PIN required for the Wi-Fi Direct connection is previously encrypted and stored in the NFC tag 210 attached to the MFP 200, the mobile device 100 may receive the encrypted PIN from the NFC tag 210 when NFC tagging is performed, and may transmit the PIN to the MFP 200 when the Wi-Fi Direct connection is attempted to be set, thereby automatically setting the Wi-Fi Direct connection. However, since automatic transmission of a PIN does not follow the Wi-Fi Direct standards, for the above-described method, firmware of the MFP 200 may need to be updated. A method of updating firmware of the MFP 200 will be described in detail below.

If the Wi-Fi Direct connection is set between the mobile device 100 and the MFP 200 (operation S205), the mobile device 100 receives from the MFP 200 device capability information indicating available operations (operation S206).

If the Wi-Fi Direct connection is set between the mobile device 100 and the MFP 200 as described above, the mobile device 100 may transmit via the Wi-Fi Direct connection to the MFP 200 a command to perform an image forming operation such as print, scan, or fax operations, or image data to be printed, such that mobile printing may be performed. Also, the mobile device 100 may receive via the Wi-Fi Direct connection from the MFP 200 data or a command required for mobile printing.

A mobile printing application to control mobile printing may be installed in the mobile device 100. Such a mobile printing application is generally developed by a manufacturer of the MFP 200 and is provided to users. A mobile printing application will now be described in detail.

Figure 3:
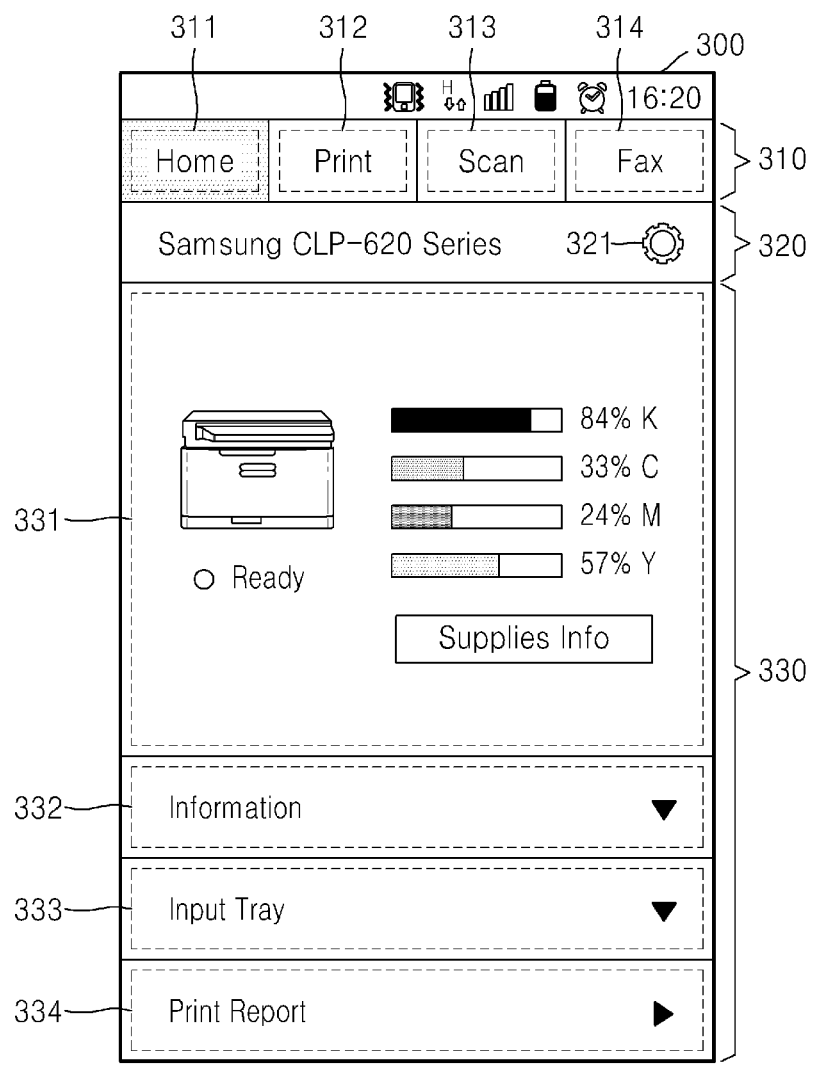
FIG. 3 is a diagram showing a default screen of a mobile printing application, according to an embodiment of the present general inventive concept.

FIG. 3 is a diagram showing a default screen 300 of a mobile printing application, according to an embodiment of the present general inventive concept. Referring to FIG. 3, the default screen 300 of the mobile printing application may include a main menu display area 310, a sub tap area 320, and a content display area 330.

The main menu display area 310 displays four main menus such as home, print, scan, and fax menus 311, 312, 313, and 314. Functions of the main menus will be described in detail below. The sub tap area 320 displays a device name of an MFP currently connected to a mobile device. If no MFP is currently connected, a message such as "No Selected Printer" may be displayed. A device settings button 321 in the sub tap area 320 is a button to activate a menu to check and manage settings of the connected MFP. A method of managing settings of an MFP by using the device settings button 321 will be described in detail below.

The content display area 330 displays contents corresponding to a selected main menu. In FIG. 3, since the home menu 311 is selected from among the main menus, the content display area 330 displays a status screen 331 of the MFP, an information button 332, an input tray button 333, and a print report button 334. Detailed descriptions thereof will be provided below.

A method of utilizing a mobile printing application in a system for mobile printing using NFC will now be described in detail.

Figure 4A:
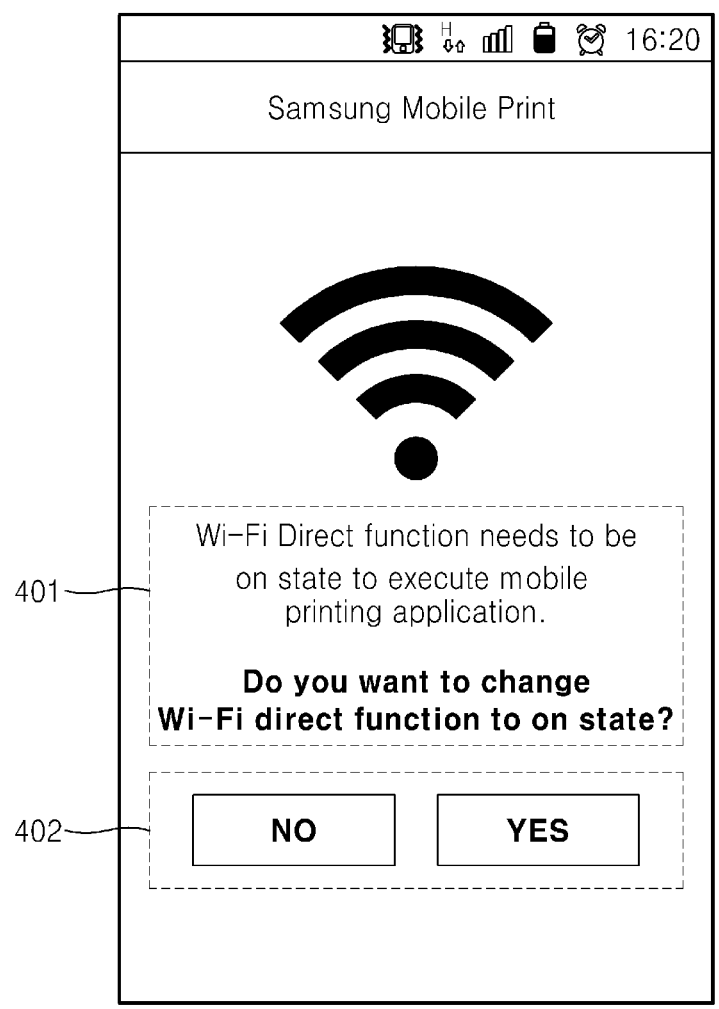
FIGS. 4A through 4C are diagrams showing screens of a mobile printing application displayed in order to connect a mobile device and an MFP, according to an embodiment of the present general inventive concept.
Figure 4B:
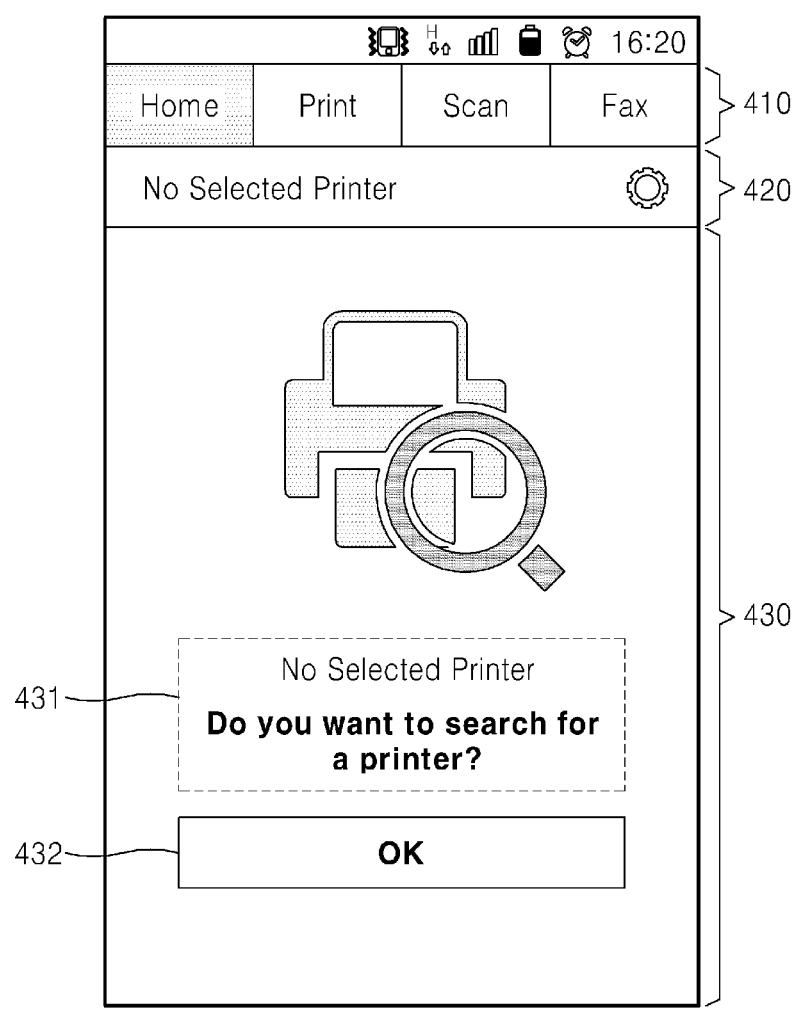
Figure 4C:
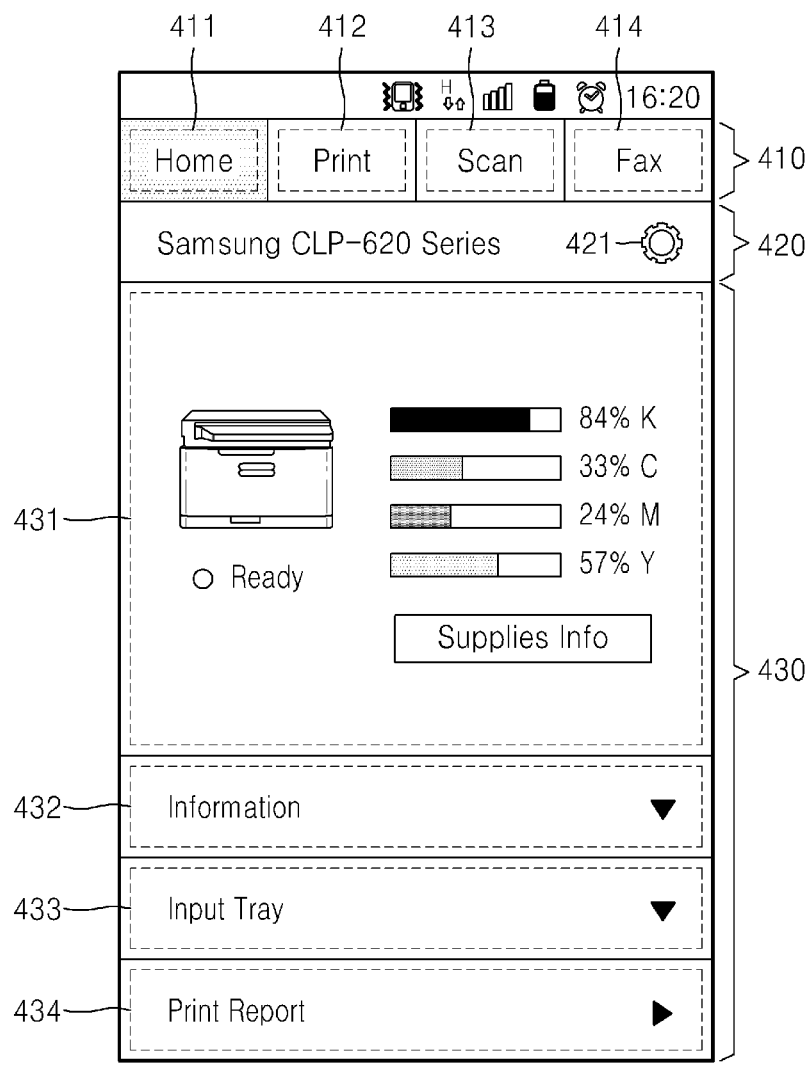

FIGS. 4A through 4C are diagrams showing screens of a mobile printing application displayed in order to connect a mobile device and an MFP, according to an embodiment of the present general inventive concept.

If a mobile printing application is executed on the mobile device, the mobile device determines whether a Wi-Fi function is on. If the Wi-Fi function is off, the screen of FIG. 4A is displayed. Area 401 of FIG. 4A displays a message indicating that the Wi-Fi function should be on to use the mobile printing application, and area 402 displays a button to select an on or off state of the Wi-Fi function. Otherwise, if the Wi-Fi function of the mobile device is already on, the screen of FIG. 4A is not displayed and the screen of FIG. 4B is displayed.

If a user selects "Yes" or "No" on the screen of FIG. 4A, the screen of FIG. 4B is displayed while the Wi-Fi function is on or off. In this case, if the user selects "No" and thus the Wi-Fi function is off, the message displayed on area 401 may be displayed again later when the Wi-Fi function should be on.

On the screen of FIG. 4B, since no MFP is currently connected to the mobile device, a sub tap 420 displays a message such as "No Selected Printer." Area 431 of a content display area 430 displays a message asking whether to search for a printer (MFP), and area 432 displays a button for confirming to search for a printer (MFP).

On the screen of FIG. 4B, if a user touches the button displayed on area 432, the mobile device searches for a printer. In this case, the user may select an MFP to be connected, on an MFP list previously stored in the mobile device, or by approaching and performing NFC tagging on the MFP. A process of performing NFC tagging on and setting a Wi-Fi Direct connection to an MFP has already been described above in detail.

FIG. 4C shows a display screen of the mobile device when a Wi-Fi Direct connection is set between the mobile device and an MFP. A main menu display area 410 displays that a home menu 411 is currently selected from among main menus, and a sub tap area 420 displays a device name of a currently connected MFP. A content display area 430 displays contents corresponding to the selected main menu.

From among the main menus, the home menu 411 is a menu to allow a user to check and manage information of the MFP, for example, its status and settings. A mobile printing application according to an embodiment of the present general inventive concept increases user convenience by including the home menu 411 as a main menu so as to allow the user to check information about an MFP and to manage the MFP by using the mobile printing application. From among the main menus, print, scan, and fax menus 412, 413, and 414 are menus to perform print, scan, and fax operations, respectively. Screens of the mobile printing application when these menus are selected will be described below.

On the screen of FIG. 4C, since the home menu 411 is selected from among the main menus, area 431 displays a status of the connected MFP, area 432 displays an information button, area 433 displays an input tray button, and area 434 displays a print report button.

According to another embodiment of the present general inventive concept, a function may be automatically performed according to NFC tagging. In other words, if a mobile device is NFC-tagged on an MFP, a function corresponding to a status of a mobile printing application at a point of time when NFC tagging is performed may be automatically performed. For example, a command corresponding to a menu or a file selected on the mobile printing application, when NFC tagging is performed, may be transmitted to the MFP. In other words, a command corresponding to a main menu of the mobile printing application, which is selected when NFC tagging is performed, for example, the home, print, scan, or fax menu 411, 412, 413, or 414, may be transmitted to the MFP.

Accordingly, as illustrated in FIG. 4C, if NFC tagging is performed while the home menu 411 is selected from among the main menus, the mobile device sets a Wi-Fi Direct connection to the MFP and then automatically transmits to the MFP a command requesting status information. The MFP transmits the status information to the mobile device in response to the request. The mobile device receives and displays the status information on a screen so as to allow a user to check the status of the MFP. In this case, as illustrated in FIG. 4C, the displayed status information of the MFP may include, for example, a graphic image of the MFP, a ready or error status, and a toner indicator. If the user requests other information via a button input, the other information may be displayed. Also, if the Wi-Fi Direct connection is set between the mobile device and the MFP via NFC tagging while the home menu 411 is selected, the connected MFP is set as a device to perform print, scan, and fax operations.

The status information of the MFP displayed on the mobile device may be updated cyclically or at a certain point of time. For example, while the mobile device and the MFP maintain the Wi-Fi Direct connection, the status information may be repeatedly updated in a certain cycle and may be displayed on the mobile device. Alternatively, the status information of the MFP may be received and updated only when the mobile device is NFC-tagged on the MFP.

Cases when the other menus are selected will now be described. If NFC tagging is performed while the print menu 412 is selected on the mobile printing application, the mobile device sets a Wi-Fi Direct connection to the MFP and sets the connected MFP as an MFP for a print operation. Alternatively, if NFC tagging is performed while the print menu 412 is selected on the mobile printing application and a certain image is displayed on a screen of the mobile device, the mobile device may automatically transmit to the MFP a data file of the image displayed on the screen and a command requesting to print the image, such that a print operation may be automatically performed.

Likewise, if NFC tagging is performed while the scan menu 413 or the fax menu 414 is selected from among the main menus of the mobile printing application, a preset function may be automatically performed.

The mobile device may be set in such a way that the home menu 411 is selected by default when the mobile printing application is executed. Alternatively, if the mobile device is NFC-tagged on the MFP while the mobile printing application is not executed, the mobile printing application may be automatically executed. In this case, the mobile device may be set in such a way that the home menu 411 is selected from among main menus, and thus the status information of the MFP is displayed. In other words, a user may execute the mobile printing application and may check the status information of the MFP by merely allowing the mobile device to be tagged on an NFC tag of the MFP.

An operation when a home menu is selected from among main menus of a mobile printing application in a system for mobile printing using NFC, according to an embodiment of the present general inventive concept, will now be described in detail. FIG. 5A through 5E are diagrams showing various screens when a home menu is selected from among main menus of a mobile printing application, according to an embodiment of the present general inventive concept.

Figure 5A:
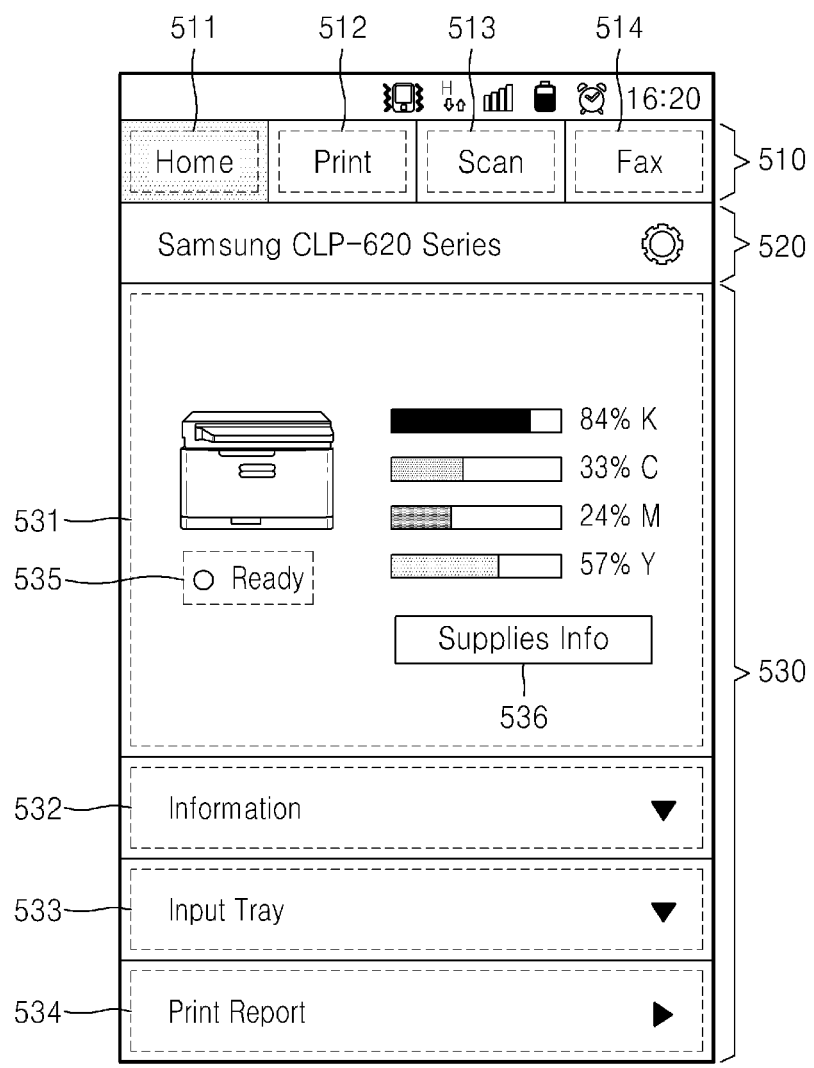
FIG. 5A through 5E are diagrams showing various screens when a home menu is selected from among main menus of a mobile printing application, according to an embodiment of the present general inventive concept.
Figure 5B:
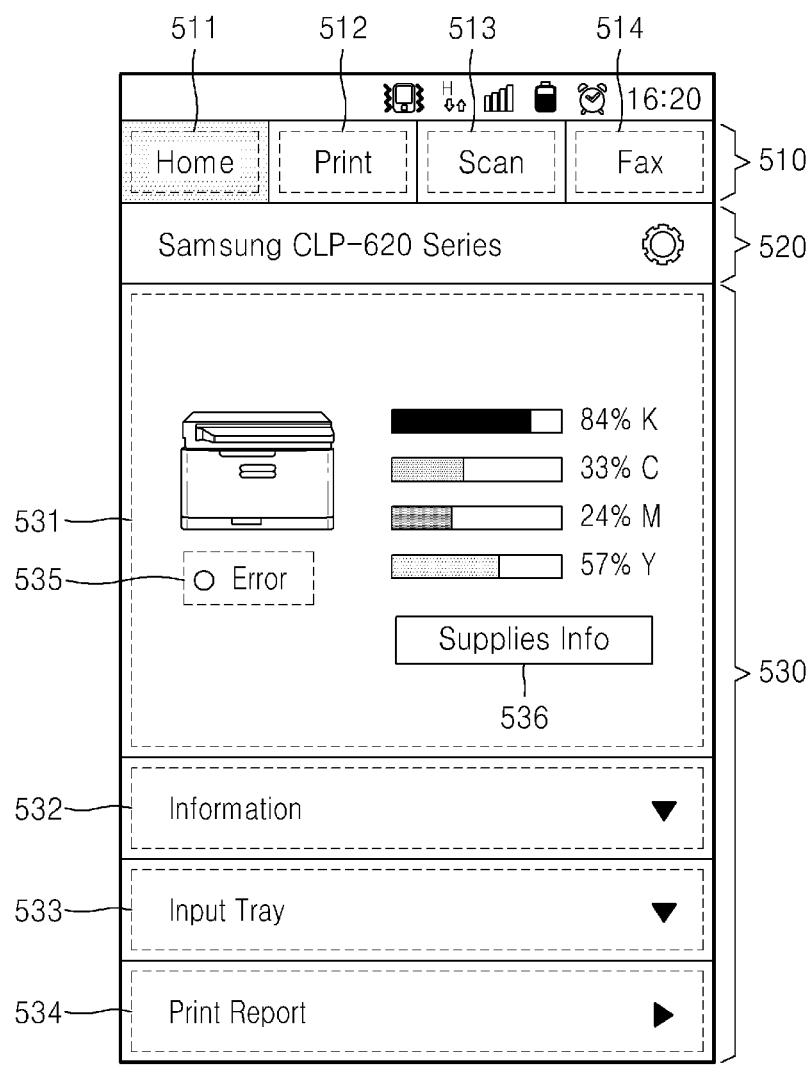
Figure 5C:
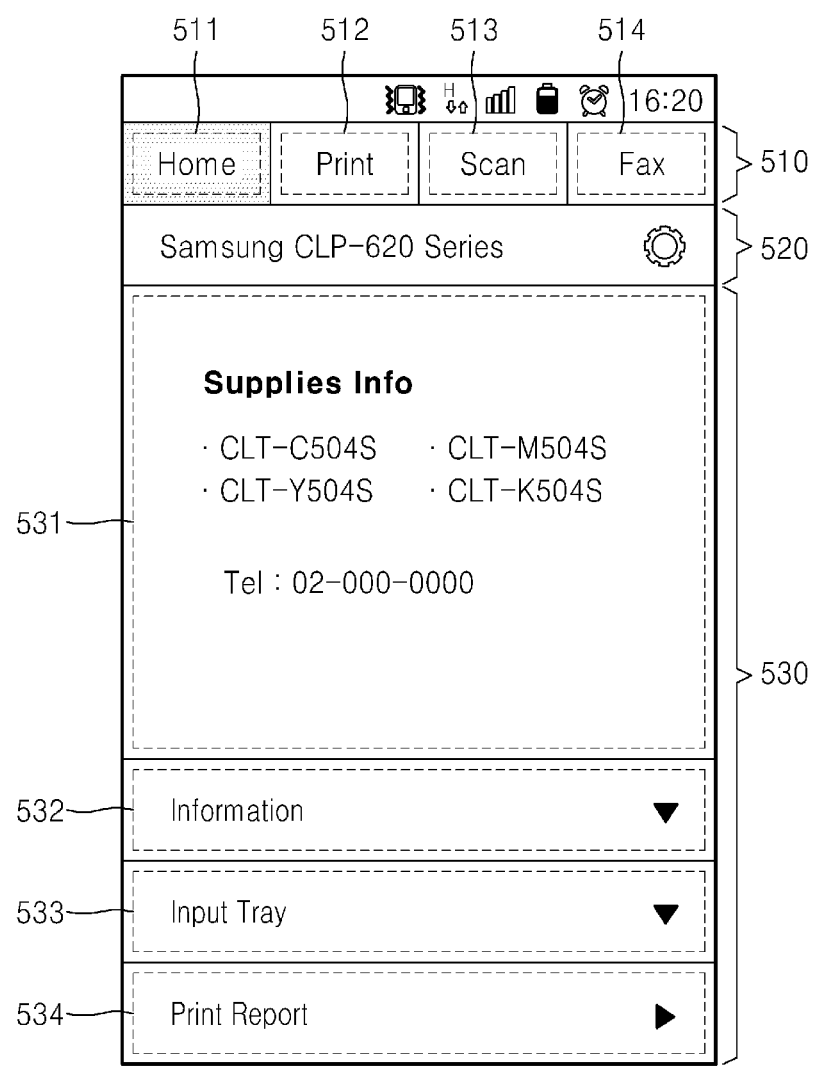

FIG. 5A shows a default screen when a home menu 511 is selected from among main menus of a mobile printing application, according to an embodiment of the present general inventive concept. As described above in relation to FIG. 4C, a content display area 530 displays a status of a connected MFP. Specifically, in this case, area 535 displays a current status of the MFP as a ready status or an error status. If the MFP is in a ready status, and thus is enabled to perform an operation such as a print operation, "Ready" is displayed as illustrated in FIG. 5A. If the MFP has an error, and thus is unable to perform an operation, "Error" is displayed as illustrated in FIG. 5B.

A user may obtain information about supplies of the MFP. If the user touches a supplies information button 536 of FIG. 5A, a mobile device may display a screen of FIG. 5C, and area 531 may display model names of toners installed in the MFP, and contact information of a place where the toners may be purchased.

Figure 5D:
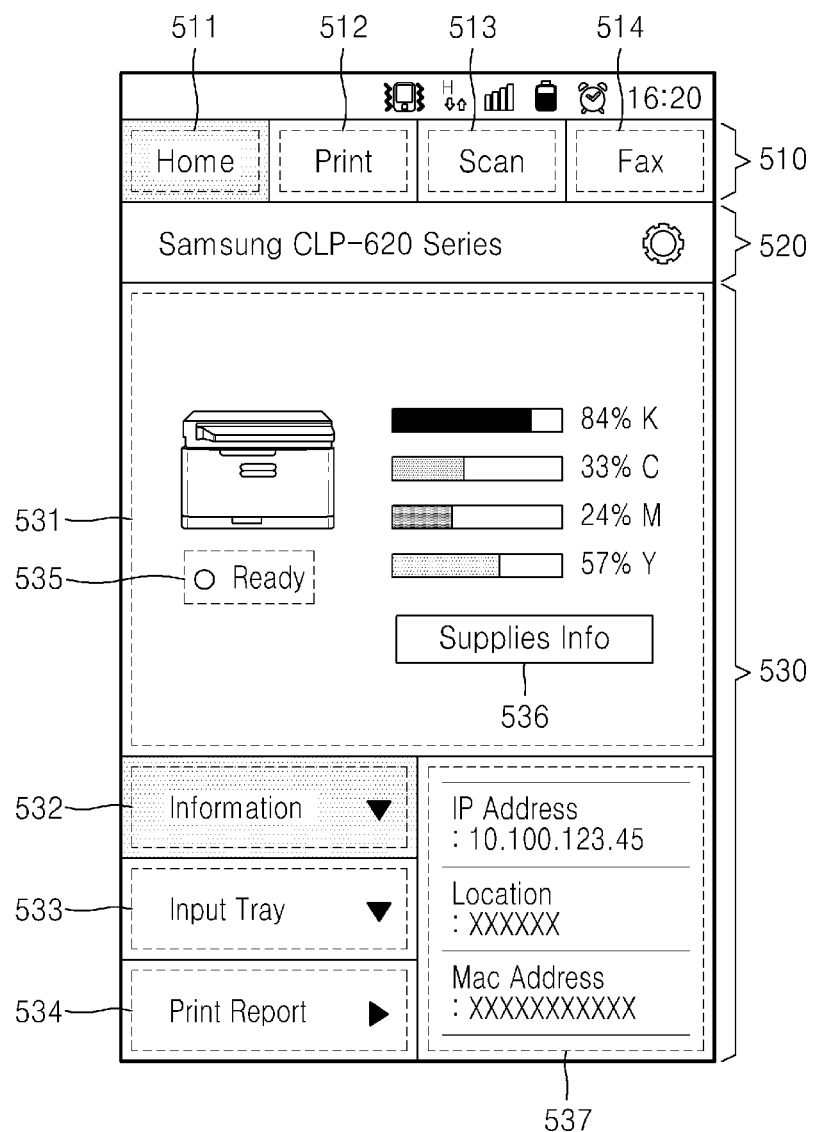
Figure 5E:
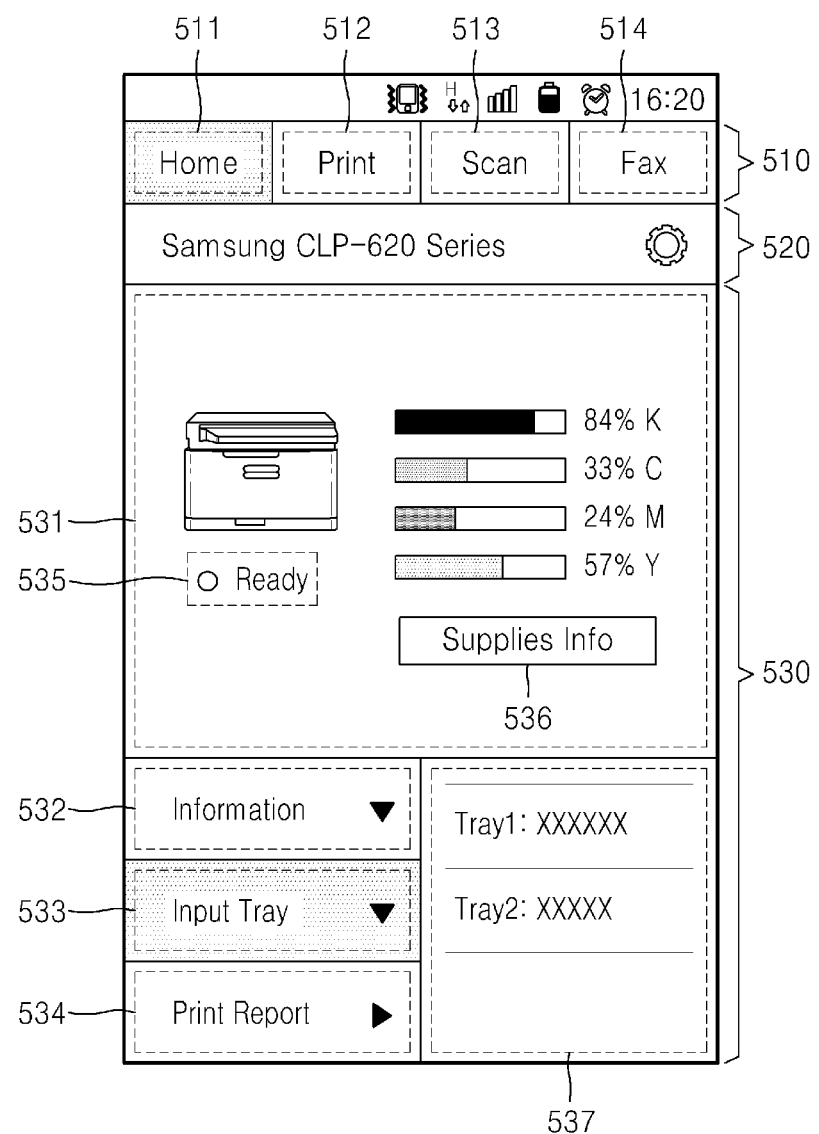

If the user touches an information button 532 in FIG. 5A, as illustrated in FIG. 5D, information of the MFP, for example, an IP address, a location, and a MAC address of the MFP, is displayed (see section 537). Also, if the user touches an input tray button 533 in FIG. 5A, as illustrated in FIG. 5E, information about each tray is displayed (see section 537). Furthermore, if the user touches a print report button 534 in FIG. 5A, a sub menu for printing a system report is displayed.

By using a mobile printing application according to an embodiment of the present general inventive concept, a user may check status information of an MFP and may manage various settings of the MFP. A method of managing settings of an MFP by using a mobile printing application, according to an embodiment of the present general inventive concept, will now be described in detail.

Figure 6A:
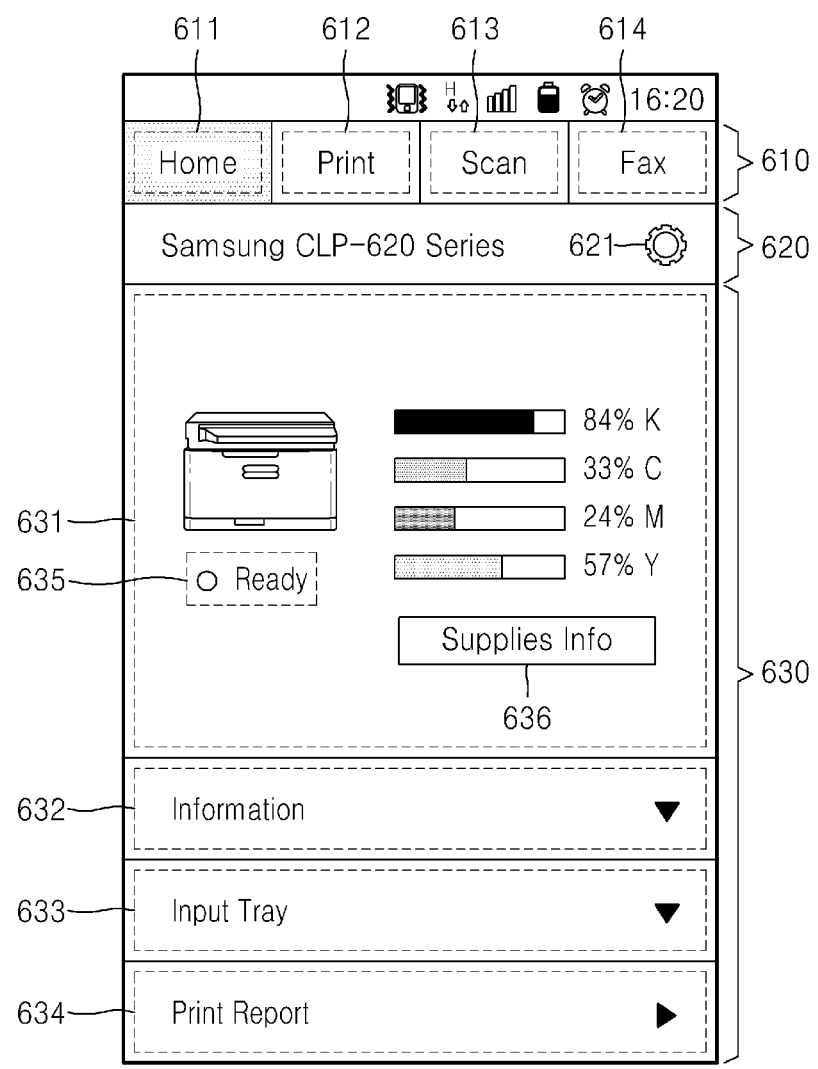
FIG. 6A through 6C are diagrams describing a method of managing settings of an MFP by using a mobile printing application, according to an embodiment of the present general inventive concept.
Figure 6B:
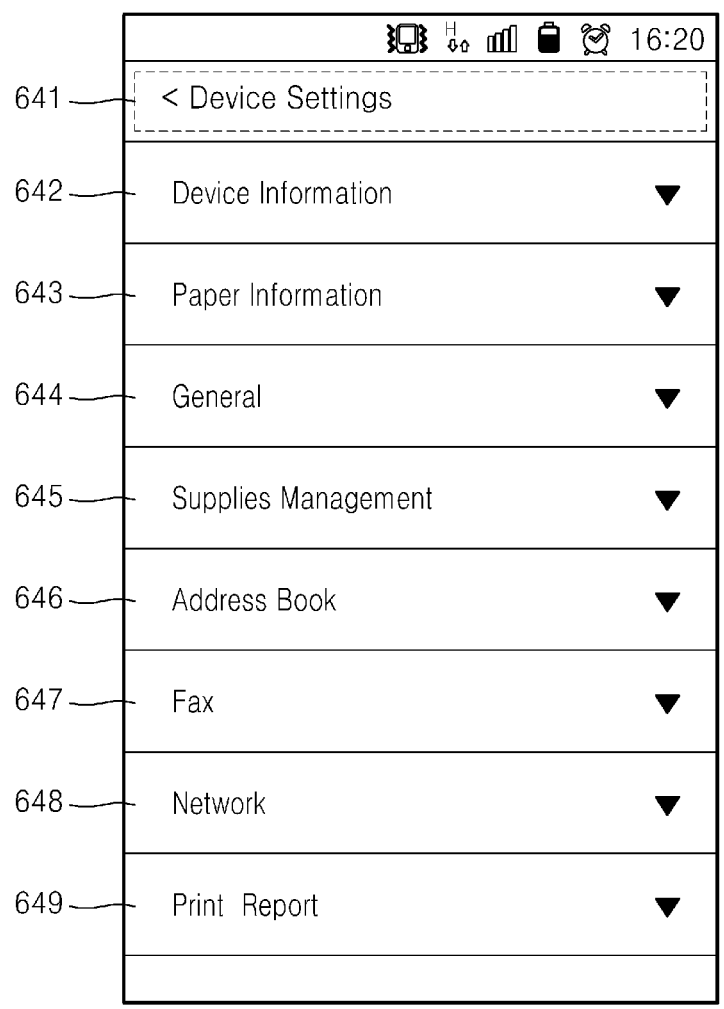
Figure 6C:
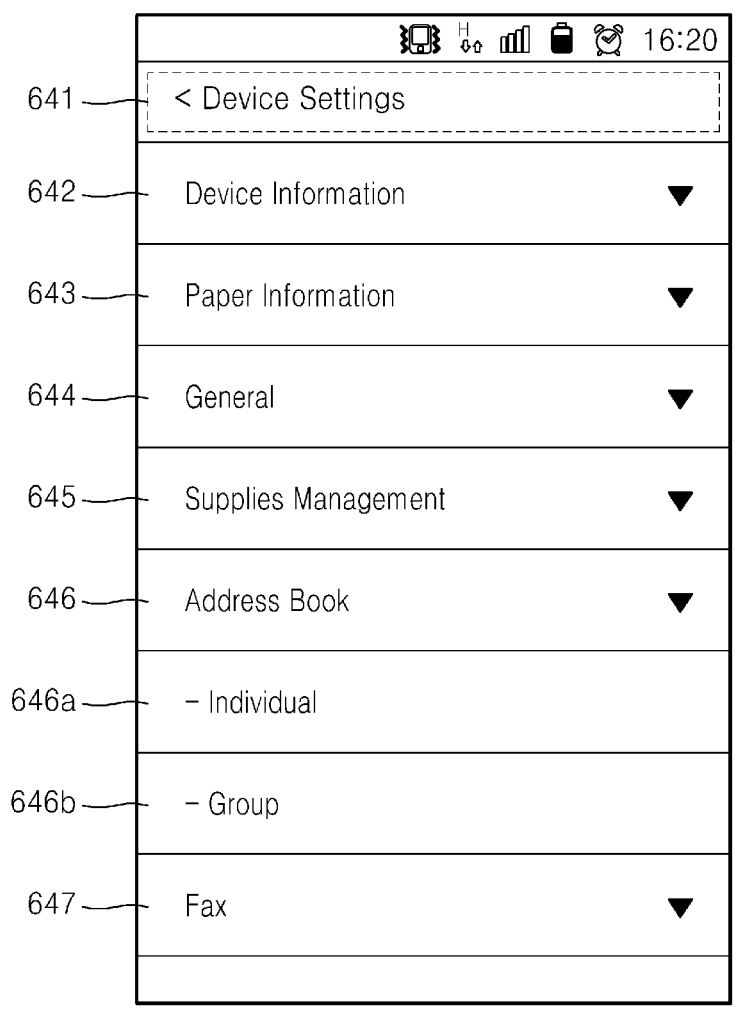

FIG. 6A through 6C are diagrams describing a method of managing settings of an MFP by using a mobile printing application, according to an embodiment of the present general inventive concept. In order to manage settings of an MFP on a default screen corresponding to a home menu 611 of FIG. 6A, a user may activate a device settings menu by touching a device settings button 621.

FIG. 6B shows a screen of a mobile device when the device settings menu is activated. An area 641 displays a message indicating that the device settings menu is currently activated. The mobile device may be set in such a way that, if a user touches the area 641, the screen returns to the previous screen of FIG. 6A. The user may check and change various settings of an MFP by touching areas 642 through 649 of FIG. 6B. For example, device information of the MFP may be checked by touching the area 642, or paper information may be checked by touching the area 643. Also, general settings of the MFP, e.g., power save, default paper size, and eco default mode settings, may be checked and changed by touching the area 644. Supplies of the MFP may be managed by touching the area 645, and an address book stored in the MFP may be edited by touching the area 646. Fax-related settings may be checked and changed by touching the area 647, and network-related settings may be made by touching the area 648. Furthermore, a print report operation for printing a system report of the MFP may be performed by touching the area 649.

FIG. 6C shows a screen in an example when a sub menu to manage an address book of an MFP is activated by touching the area 646. Referring to FIG. 6C, if a user touches the area 646, a sub menu to edit the address book by individuals, e.g., "Individual" 646a, and a sub menu to edit the address book by groups, e.g., "Group" 646b, are displayed between the areas 646 and 647. The user may select one of the sub menus to activate a menu to edit the address book by individuals or groups.

Figure 7A:
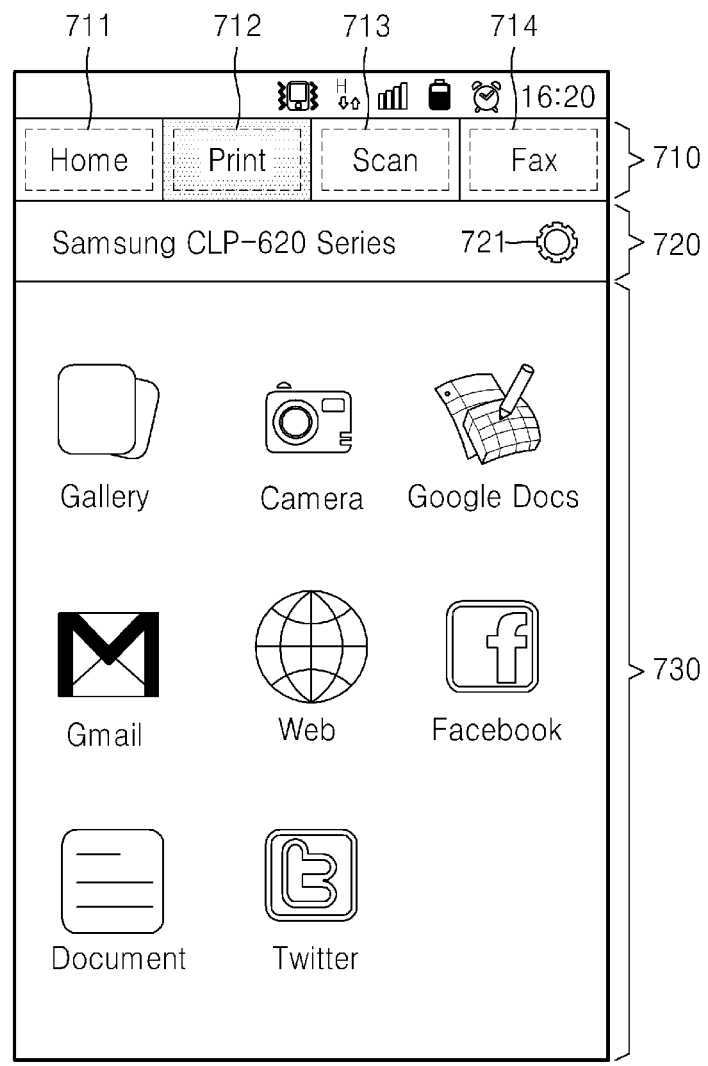
FIG. 7A through 7C are diagrams showing screens when print, scan, and fax menus are selected from among main menus of a mobile printing application, according to an embodiment of the present general inventive concept.
Figure 7B:
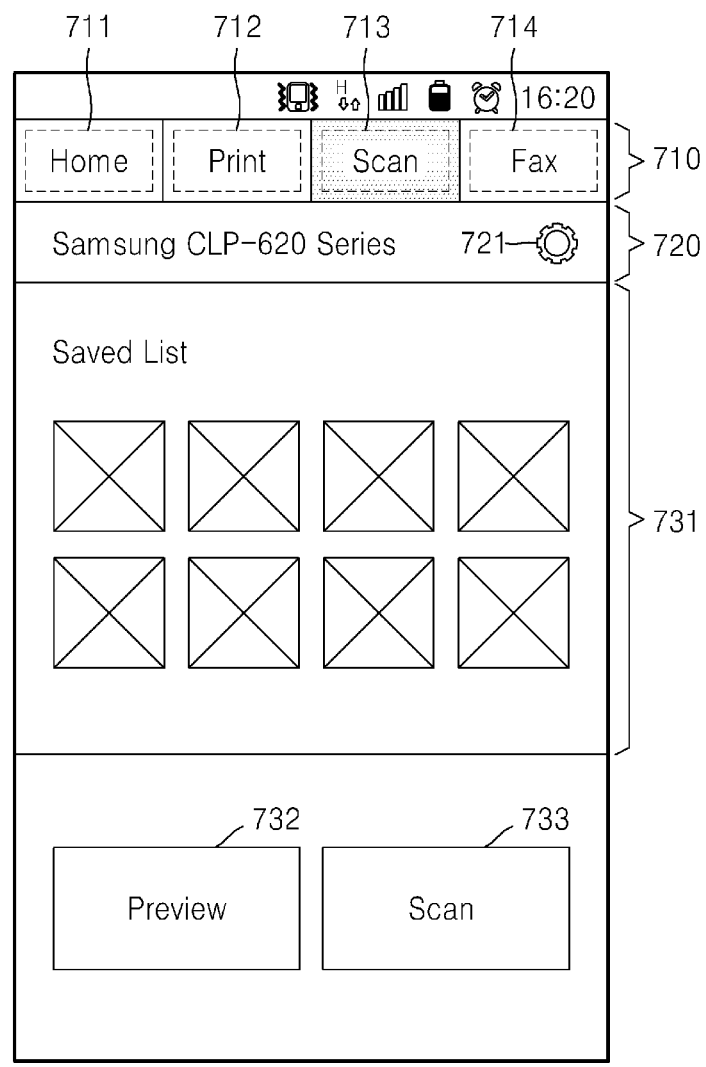
Figure 7C:
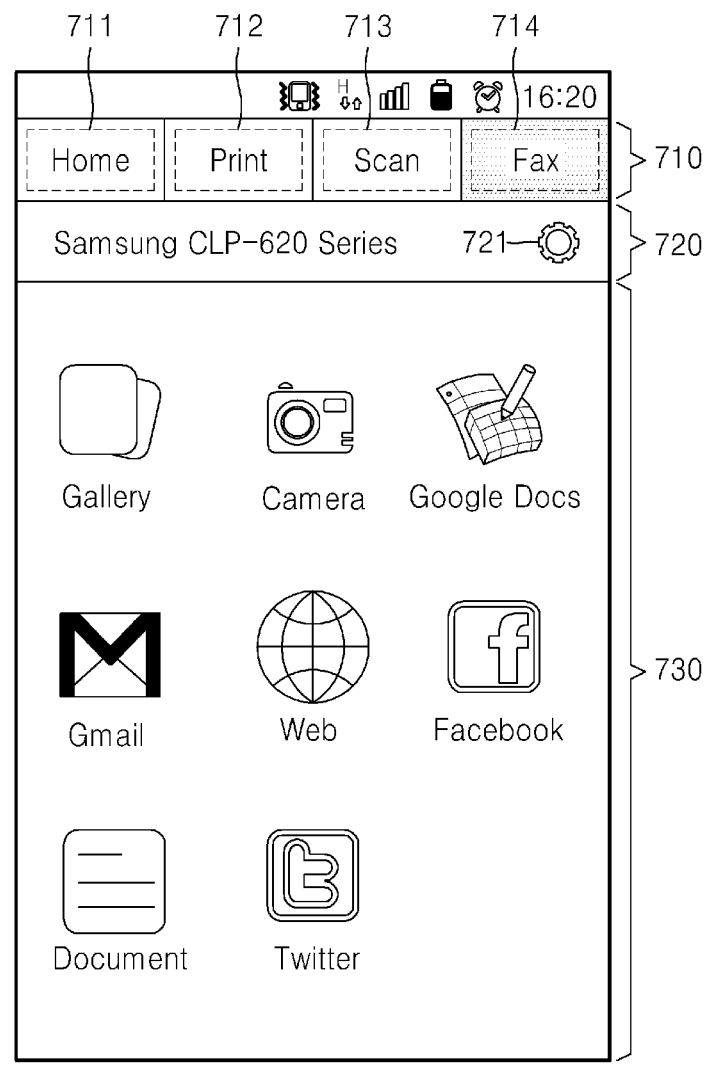

FIG. 7A through 7C are diagrams showing screens when print, scan, and fax menus 712, 713, and 714 are selected from among main menus of a mobile printing application, according to an embodiment of the present general inventive concept.

Referring to FIG. 7A, if the print menu 712 is selected in a main menu area 710, a content display area 730 displays menus to select an image or a document to be printed. These menus include "Gallery" for printing a photo stored in a mobile device, "Camera" for directly printing a photo taken by the mobile device, "Google Docs" for printing a document or an image stored in Google Docs, "Gmail" for printing a document or an image received via Gmail, "Web" for printing a document or the like retrieved from the Internet, "Facebook" for printing a photo or the like stored in Facebook, "Document" for printing a document stored in the mobile device, and "Twitter" for outputting a photo or the like stored in Twitter.

When NFC tagging is performed, a print operation may be automatically performed. For example, the mobile device may be set in such a way that, if the mobile device is tagged on an NFC tag attached to an MFP while the print menu 712 is selected from among the main menus and a user selects "Gallery" and then selects one of photos stored in "Gallery," the mobile device automatically transmits to the MFP image data of the selected photo and a command to perform a print operation.

When the mobile device and the MFP are not connected before NFC tagging is performed, if NFC tagging is performed, a Wi-Fi Direct connection between the mobile device and the MFP, as well as the transmission of the image data and the command, may be automatically performed. Otherwise, when the mobile device and the MFP are already connected before NFC tagging is performed, if NFC tagging is performed, the transmission of the image data and the command may be automatically performed.

Referring to FIG. 7B, if the scan menu 713 is selected in the main menu area 710, the content display area 730 displays scan-related contents. An area 731 displays a list of scanned images stored in the mobile device, and buttons 732 and 733 to perform preview and scan operations are displayed under the area 731. A user may perform a scan operation by placing a document to be scanned on the MFP and touching the "Scan" button 733. After the scan operation is completed, a preview operation of a scanned image may be requested by touching the "Preview" button 732.

When NFC tagging is performed, a scan operation may be automatically performed. For example, the mobile device may be set in such a way that if the mobile device is tagged on the NFC tag attached to the MFP while the scan menu 713 is selected from among the main menus, the mobile device automatically transmits to the MFP a command to perform a scan operation.

When the mobile device and the MFP are not connected before NFC tagging is performed, if NFC tagging is performed, a Wi-Fi Direct connection between the mobile device and the MFP, as well as the transmission of the command, may be automatically performed. Otherwise, when the mobile device and the MFP are already connected before NFC tagging is performed, if NFC tagging is performed, the transmission of the command may be automatically performed.

Referring to FIG. 7C, if the fax button 714 is selected in the main menu area 710, the content display area 730 displays menus to select an image or a document to be faxed. These menus are the same as the menus to select an image or a document to be printed, which are described above in relation to FIG. 7A.

When NFC tagging is performed, a fax operation may be automatically performed. For example, the mobile device may be set in such a way that when the fax button 714 is selected from among the main menus and a user selects "Document" and then selects one of documents stored in "Document," if the mobile device is tagged on the NFC tag attached to the MFP, the mobile device automatically transmits to the MFP the selected document and a command to perform a fax operation.

When the mobile device and the MFP are not connected before NFC tagging is performed, if NFC tagging is performed, a Wi-Fi Direct connection between the mobile device and the MFP, as well as the transmission of the document and the command, may be automatically performed. Otherwise, when the mobile device and the MFP are already connected before NFC tagging is performed, if NFC tagging is performed, the transmission of the document and the command may be automatically performed.

Figure 8:
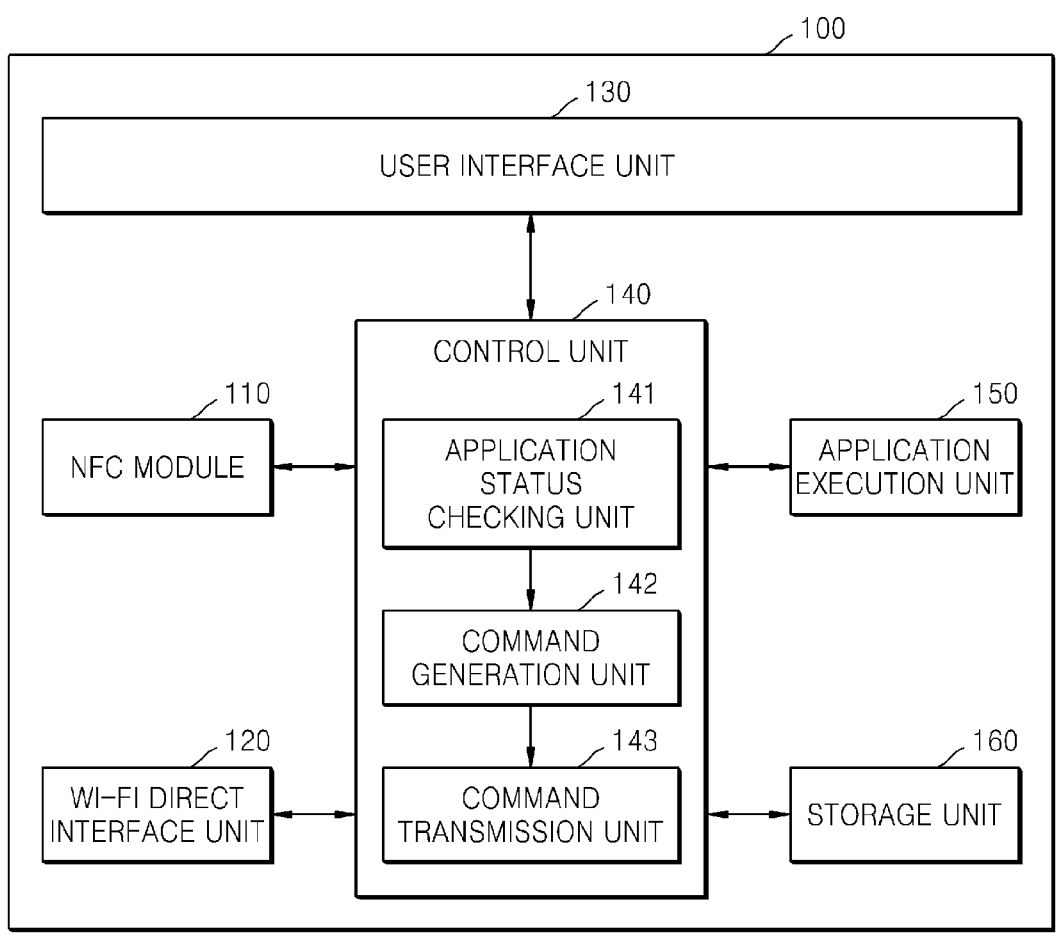
FIG. 8 is a diagram showing a hardware configuration of a mobile device, according to an embodiment of the present general inventive concept.

FIG. 8 is a diagram showing a hardware configuration of a mobile device 100, according to an embodiment of the present general inventive concept. Referring to FIG. 8, the mobile device 100 may include an NFC module 110, a Wi-Fi Direct interface unit 120, a user interface unit 130, a control unit 140, an application execution unit 150, and a storage unit 160. From among them, the control unit 140 may include an application status checking unit 141, a command generation unit 142, and a command transmission unit 143.

The NFC module 110 is an element for short-distance wireless communication and may include an antenna and an NFC chipset. If the mobile device 100 approaches an NFC tag attached to an MFP, the NFC module 110 receives information about the MFP, which is stored in the NFC tag. In this case, the received information about the MFP may include, for example, a MAC address, a device name, an application identifier, and an encrypted PIN of the MFP.

The Wi-Fi Direct interface unit 120 is an element to set a Wi-Fi Direct connection between the mobile device 100 and another device that supports Wi-Fi Direct. In an embodiment of the present general inventive concept, the mobile device 100 sets a Wi-Fi Direct connection to the MFP via the Wi-Fi Direct interface unit 120 and transmits and receives data and a command for mobile printing.

The user interface unit 130 displays a screen to a user and receives various inputs from the user. For example, the user interface unit 130 may be formed as a touch screen and, if a mobile printing application is executed, may display an execution screen on the touch screen and may receive a touch input from the user.

The control unit 140 sets a Wi-Fi Direct connection to the MFP, executes the mobile printing application, and generates and transforms a command for mobile printing. The control unit 140 may allow a Wi-Fi Direct connection to be set between the mobile device 100 and the MFP by using the information about the MFP, which is received by the NFC module 110, and may allow the mobile printing application to be executed by controlling the application execution unit 150.

The control unit 140 may control a function to be automatically performed according to a status of the mobile printing application at a point of time when the mobile device 100 is NFC-tagged on the MFP. In more detail, when the application execution unit 150 executes the mobile printing application, if the NFC module 110 of the mobile device 100 approaches the NFC tag attached to the MFP and thus NFC tagging is performed, the application status checking unit 141 of the control unit 140 checks the status of the mobile printing application. In this case, the status of the mobile printing application denotes, for example, a menu or a file currently selected on the mobile printing application, or a currently displayed execution screen of the mobile printing application.

If the application status checking unit 141 checks the status of the mobile printing application when NFC tagging is performed, the command generation unit 142 generates a command corresponding to the checked status, and the command transmission unit 143 transmits the generated command via the Wi-Fi Direct interface unit 120 to the MFP. For example, if the status of the mobile printing application when NFC tagging is performed, which is checked by the application status checking unit 141, denotes that a home menu is selected from among main menus, the command generation unit 142 generates a command requesting various types of status information of the MFP, and the command transmission unit 143 transmits the generated command via the Wi-Fi Direct interface unit 120 to the MFP. If the MFP transmits the status information of the MFP in response to the command, the mobile device 100 receives the status information of the MFP via the Wi-Fi Direct interface unit 120, and the control unit 140 displays the status information on the user interface unit 130.

The storage unit 160 may store image data such as photos and documents. The mobile device 100 may transmit to the MFP image data or a document stored in the storage unit 160, so as to request a print or fax operation, or may receive from the MFP image data or a document obtained by performing a scan operation, so as to store the received image data or the document in the storage unit 160.

A method of mobile printing using NFC, according to an embodiment of the present general inventive concept, will now be described in detail.

Figure 9:
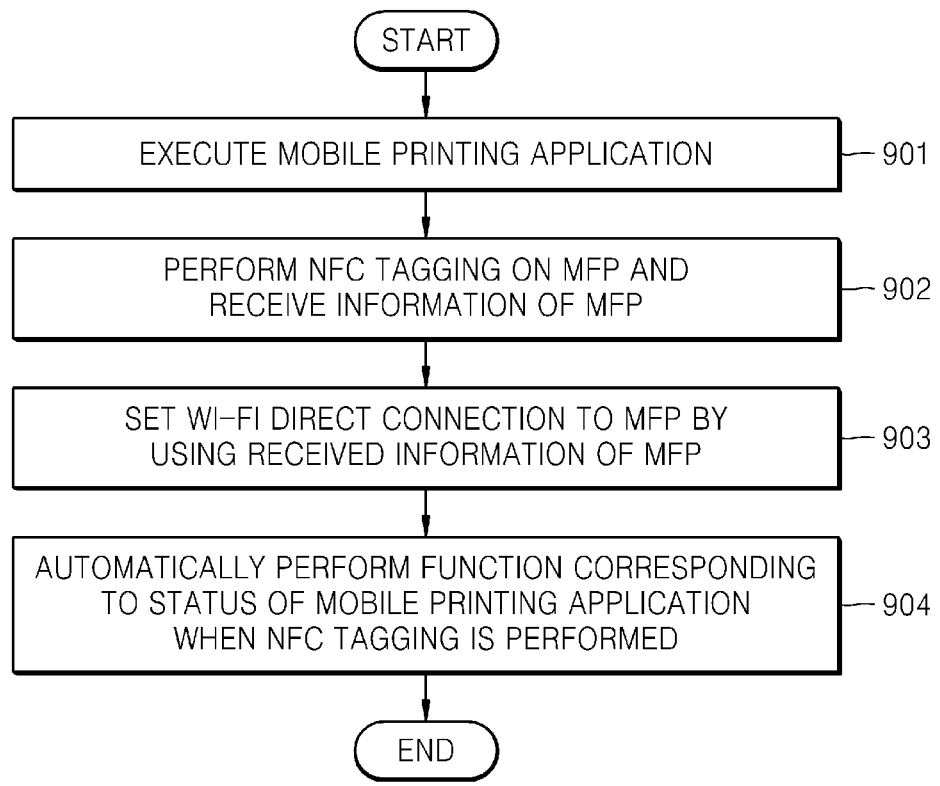
FIGS. 9 through 13 are flowcharts of methods of mobile printing using NFC, according to embodiments of the present general inventive concept.

FIG. 9 is a flowchart of a method of mobile printing using NFC, according to an embodiment of the present general inventive concept. Referring to FIG. 9, a mobile printing application is executed on a mobile device in operation 901. In this case, the mobile printing application may be executed if a user touches an icon of the mobile printing application, which is displayed on a touch screen of the mobile device.

If the mobile printing application is executed, the mobile device should approach an MFP to perform NFC tagging and then receives information about the MFP in operation 902. If the mobile device approaches an NFC tag attached to the MFP, an NFC module of the mobile device receives the information about the MFP, which is stored in the NFC tag. In this case, the received information may include, for example, a MAC address, a device name, and an encrypted PIN of the MFP.

The mobile device attempts to set a Wi-Fi Direct connection to the MFP by using the received information about the MFP in operation 903. The mobile device searches for a device having the received MAC address and, if the MFP is found, requests the found MFP for the Wi-Fi Direct connection. In this case, the Wi-Fi Direct connection may be set if the user presses a WPS button included in the MFP, or inputs a PIN via a user interface of the MFP. Alternatively, the Wi-Fi Direct connection may be automatically set without a user input if the mobile device transmits to the MFP the encrypted PIN included in the information about the MFP, which is received in operation 902. In order to set the Wi-Fi Direct connection by transmitting the encrypted PIN, firmware of the MFP should support the above connection method. If the MFP doesn't support the above connection method, the firmware of the MFP may be updated to a version that supports the above connection method. A method of updating firmware will be described in detail below.

If the Wi-Fi Direct connection is set between the mobile device and the MFP, the mobile device and the MFP automatically perform a function corresponding to a status of the mobile printing application when NFC tagging is performed, in operation 904. In other words, a function corresponding to a menu or a file currently selected on the mobile printing application, when NFC tagging is performed, is performed. For example, if NFC tagging is performed while a home menu is selected from among main menus of the mobile printing application, the mobile device requests the MFP for status information of the MFP, and receives and displays the status information on a screen. Alternatively, if NFC tagging is performed while a print menu is selected from among main menus of the mobile printing application, the mobile device requests the MFP for a print operation and the MFP performs the print operation.

As such, by checking a status of a mobile printing application when NFC tagging is performed and automatically performing a function corresponding to the status, a desired operation may be easily performed by merely performing NFC tagging without a separate user input.

Figure 10:
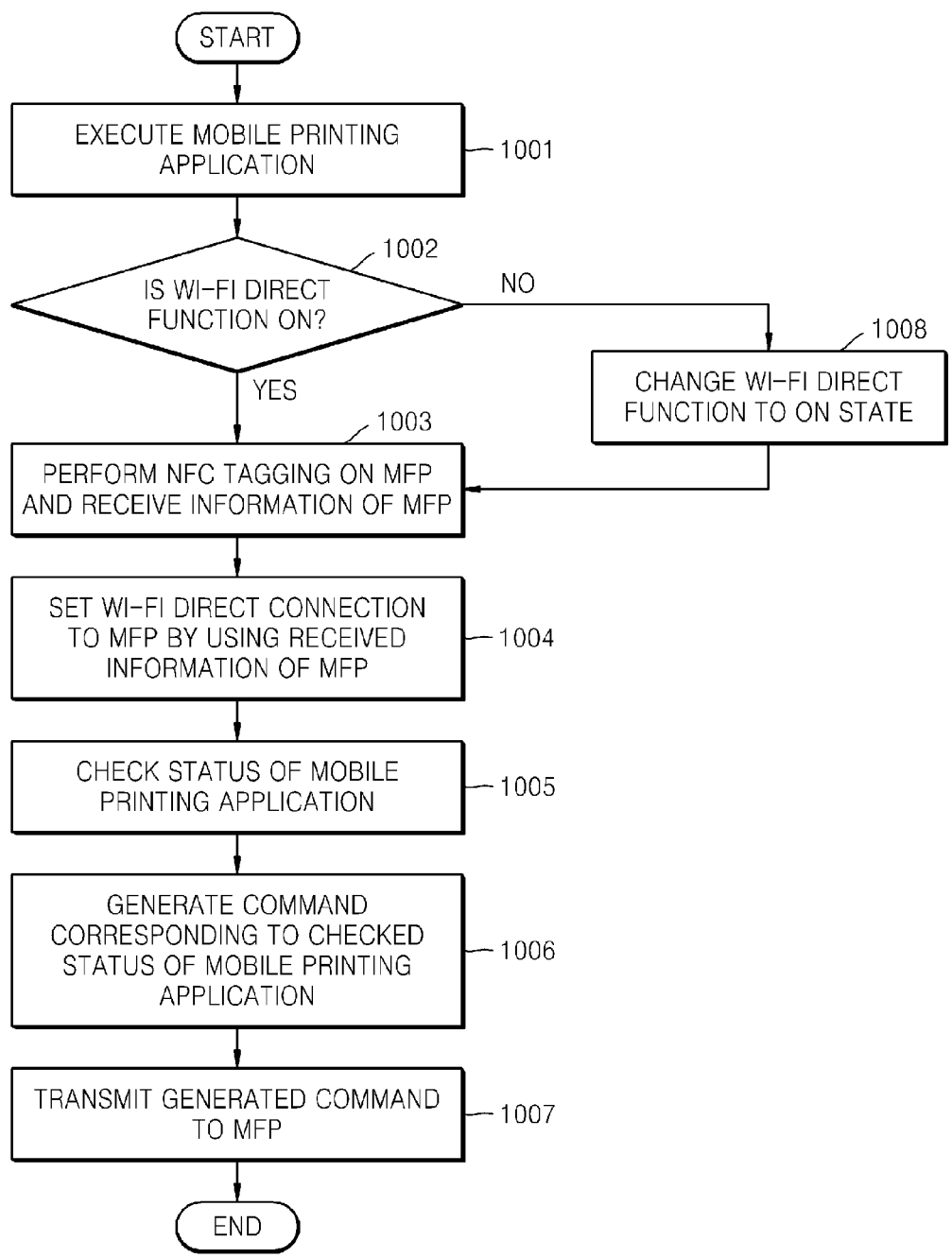

FIG. 10 is a flowchart illustrating a method of mobile printing using NFC, according to another embodiment of the present general inventive concept.

Referring to FIG. 10, a mobile printing application is executed on a mobile device, in operation 1001. In this case, the mobile printing application may be executed if a user touches an icon of the mobile printing application, which is displayed on a touch screen of the mobile device.

If the mobile printing application is executed, it is determined whether a Wi-Fi Direct function of the mobile device is on, in operation 1002. If it is determined that the Wi-Fi Direct function of the mobile device is on, the method proceeds to operation 1003 and the mobile device is NFC-tagged on an MFP and receives information about the MFP, for example, a MAC address, a device name, and a PIN of the MFP. If it is determined that the Wi-Fi Direct function is off, the method proceeds to operation 1008 and the Wi-Fi Direct function of the mobile device is changed to an on state, and then the method proceeds to operation 1003. In this case, operation 1008 may be performed by displaying on a screen of the mobile device a message indicating that the Wi-Fi Direct function should be on to use the mobile printing application, and receiving from the user an input to change the Wi-Fi Direct function to an on state.

A Wi-Fi Direct connection is set to the MFP by using the received information of the MFP in operation 1004. If the Wi-Fi Direct connection is completely set, a status of the mobile printing application is checked in operation 1005. In more detail, the status of the mobile printing application at a point of time when NFC tagging is performed in operation 1003 is checked. In this case, the status of the mobile printing application denotes, for example, a menu or a file currently selected on the mobile printing application, or a currently displayed application screen of the mobile device.

A command corresponding to the status of the mobile printing application, which is checked in operation 1005, is generated in operation 1006, and the generated command is transmitted to the MFP in operation 1007.

As such, by checking a status of a mobile printing application when NFC tagging is performed and automatically performing a function corresponding to the status, a desired operation may be easily performed by merely performing NFC tagging without a separate user input.

Figure 11:
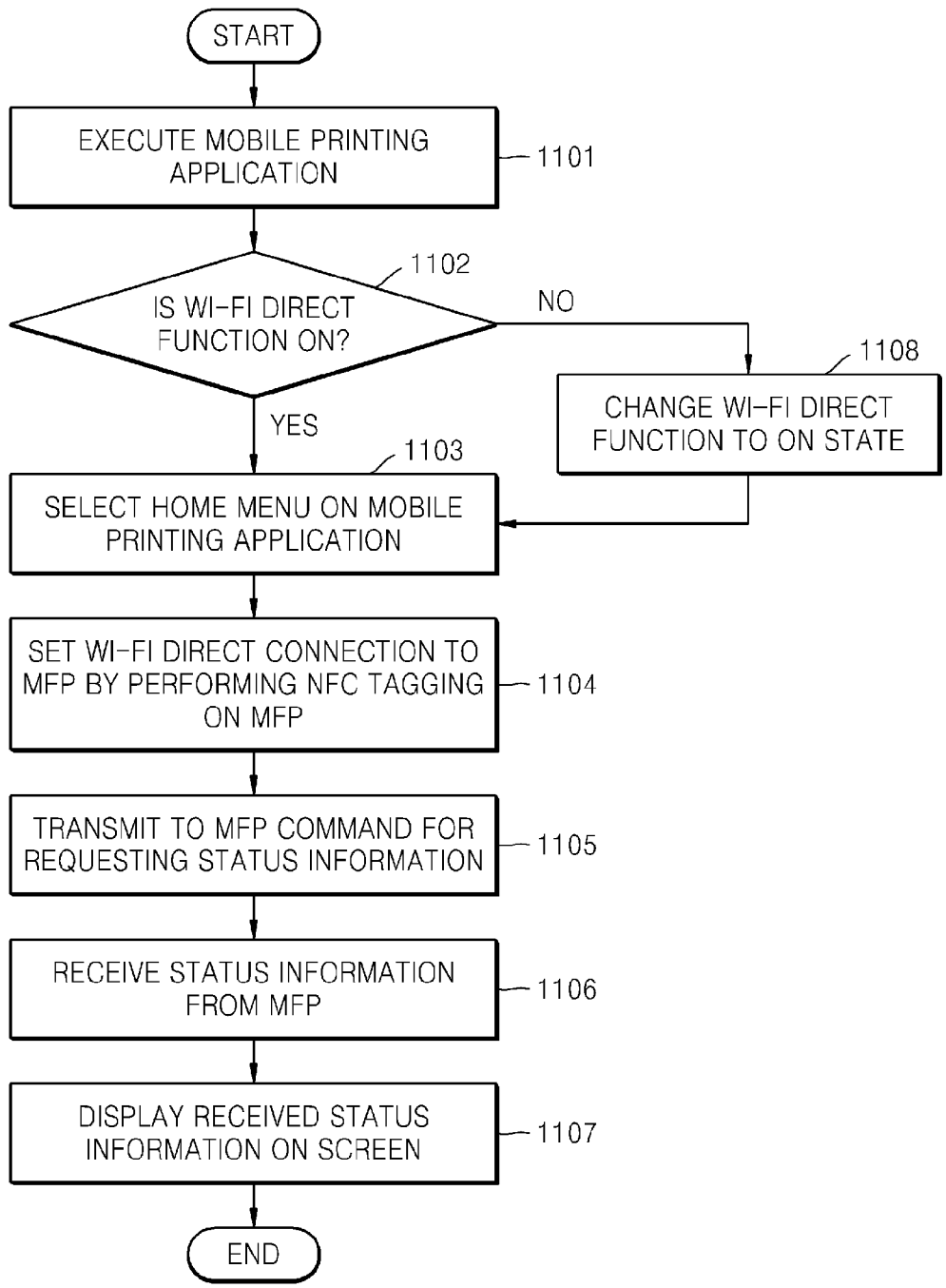

FIG. 11 is a flowchart of a method of mobile printing using NFC, according to another embodiment of the present general inventive concept. Specifically, FIG. 11 shows a case when NFC tagging is performed while a home menu of a mobile printing application is selected.

Referring to FIG. 11, the mobile printing application is executed in operation 1101. It is determined whether a Wi-Fi Direct function is on, in operation 1102. If the Wi-Fi Direct function is not on, the method proceeds to operation 1108 and the Wi-Fi Direct function is changed to an on state. If the Wi-Fi Direct function is on, the method proceeds to operation 1103.

A home menu is selected from among main menus of the mobile printing application in operation 1103. In this case, the home menu may be manually selected by a user, or may be set as a default menu, and thus may be selected by default when the mobile printing application is executed. In the latter case, operation 1103 may be omitted.

A mobile device is NFC-tagged on an MFP and sets a Wi-Fi Direct connection to the MFP in operation 1104. A process of performing NFC tagging and setting a Wi-Fi Direct connection has already been described above in detail. If the Wi-Fi Direct connection is set, the mobile device transmits to the MFP a command requesting status information, in operation 1105. Since the home menu is selected on the mobile printing application when NFC tagging is performed in operation 1104, a command requesting the status information of the MFP and corresponding to the home menu is transmitted. If a print, scan, or fax menu, instead of the home menu, is selected on the mobile printing application when NFC tagging is performed, a command corresponding to the selected menu is transmitted.

If the MFP transmits the status information in response to the command requesting the status information, the mobile device receives the status information in operation 1106, and displays the status information on a screen to allow the user to check it in operation 1107.

As such, by including a home menu to manage information and settings of an MFP in a mobile printing application and automatically receiving and displaying status information of the MFP when NFC tagging is performed while the home menu is selected, the information and settings of the MFP may be easily managed.

Figure 12:
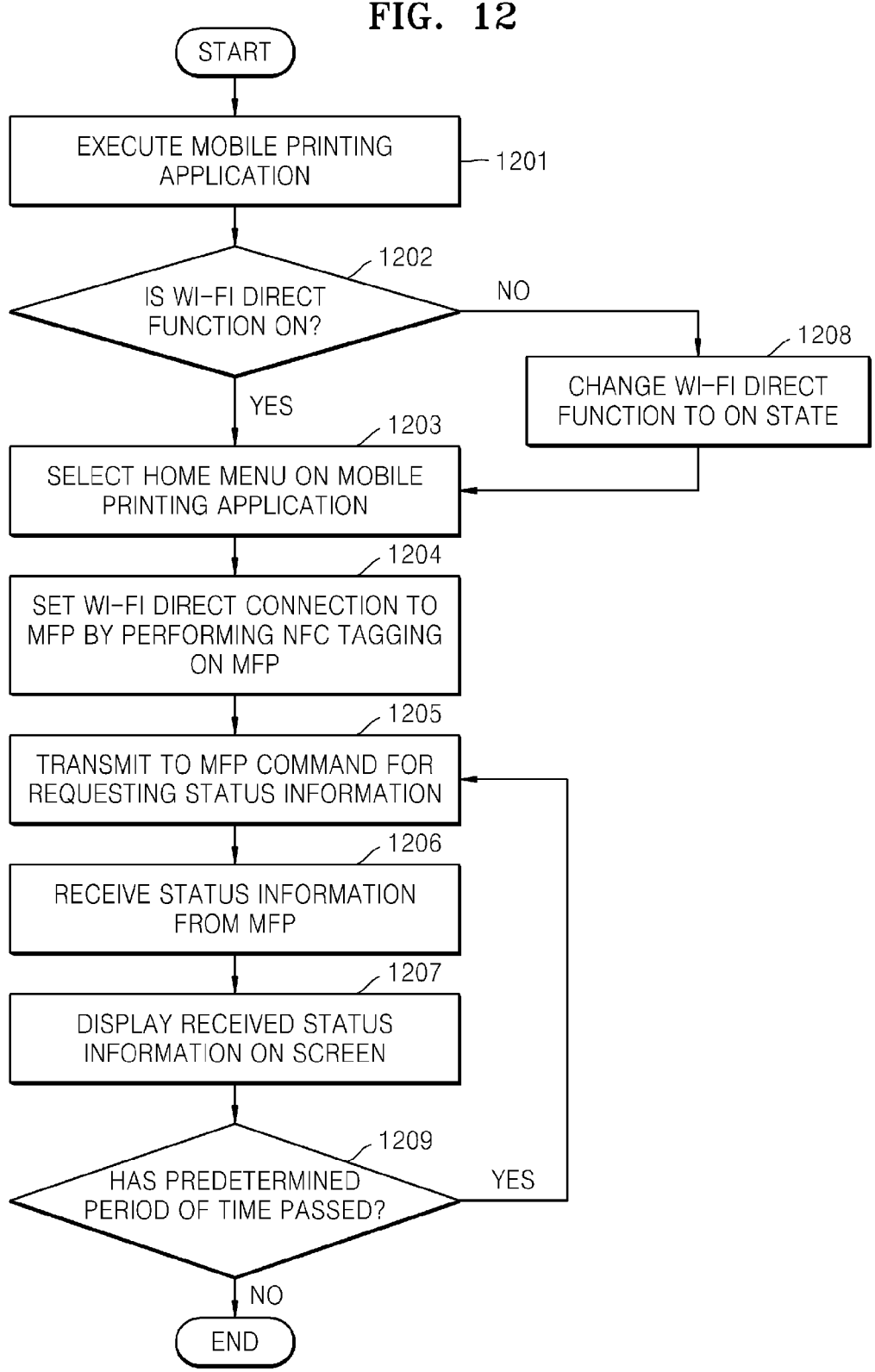

When a Wi-Fi Direct connection is set between a mobile device and an MFP, status information of the MFP may be cyclically updated. A method thereof is illustrated in FIG. 12. Operations 1201 through 1208 of FIG. 12 are respectively the same as operations 1101 through 1108 of FIG. 11, and thus detailed descriptions thereof are not provided here.

Referring to FIG. 12, after status information of an MFP is displayed on a screen of a mobile device in operation 1207, it is determined whether a certain period of time has passed, in operation 1209. If the certain period of time has not passed, no particular operation is performed. If the certain period of time has passed, the method returns to operation 1205 and the mobile device transmits to the MFP a command requesting the status information.

As such, by cyclically updating status information of an MFP and displaying the status information on a mobile device while the mobile device and the MFP are wirelessly connected, a user may easily check the latest information of the MFP.

If a Wi-Fi Direct connection is set between a mobile device and an MFP while a home menu is selected on the mobile printing application, a user may not only check status information of the MFP, but may also manage various settings of the MFP by using a mobile printing application. A detailed description thereof will now be provided with reference to FIG. 13.

Figure 13:
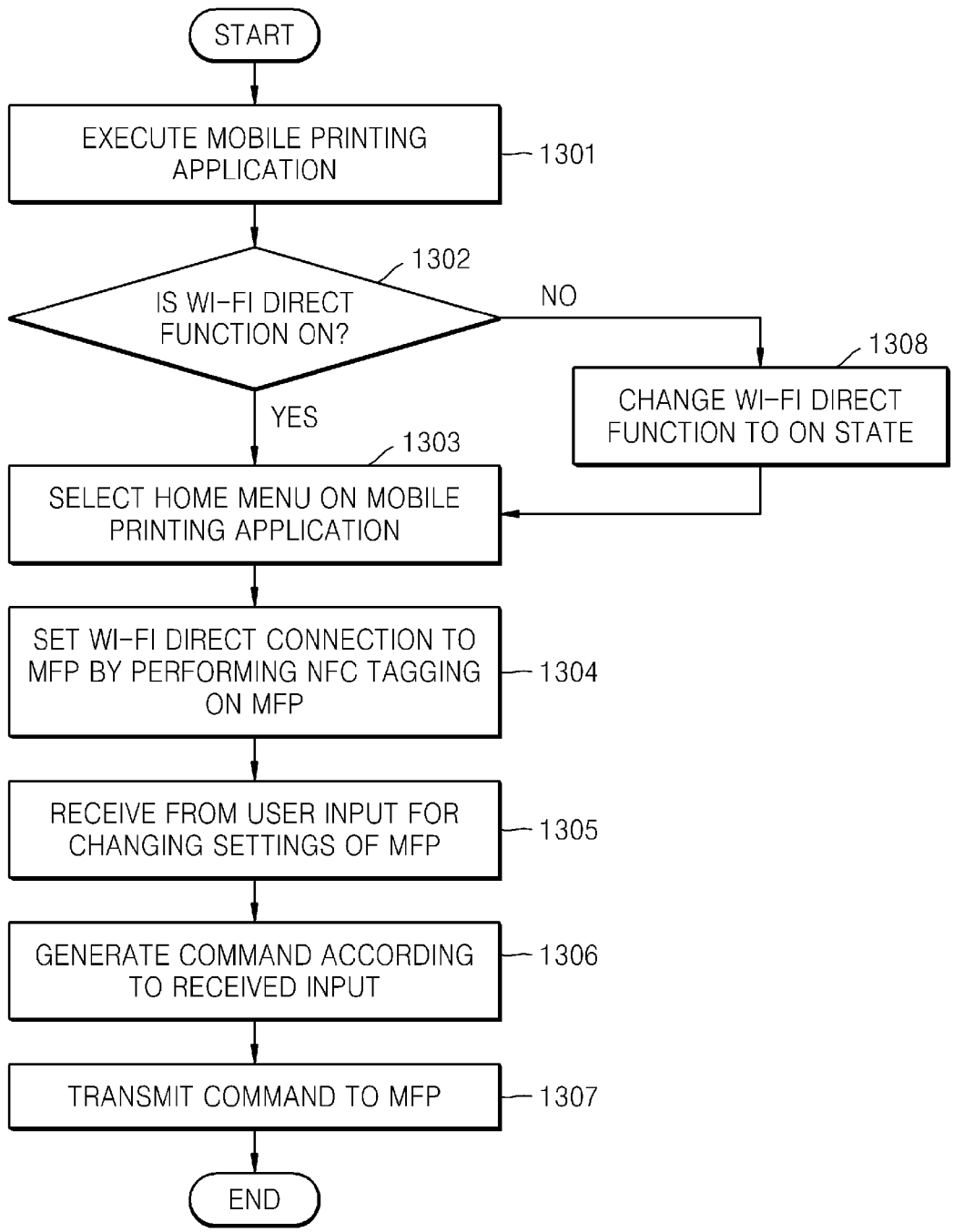

FIG. 13 is a flowchart of a method for mobile printing using NFC, according to another embodiment of the present general inventive concept. Operations 1301 through 1304, and 1308 of FIG. 13 are respectively the same as operations 1101 through 1104, and 1108 of FIG. 11, and thus detailed descriptions thereof are not provided here.

Referring to FIG. 13, an input to change settings of an MFP is received from a user in operation 1305. The user may activate a screen to manage the settings of the MFP, by touching a device settings button while a home menu is selected on a mobile printing application, may select an item of which settings are to be changed, and then may input a desired setup value.

If the input to change the settings of the MFP is received from the user, a command to change the settings may be generated according to the received input in operation 1306, and the generated command may be transmitted to the MFP in operation 1307.

As such, since a user may manage various settings of an MFP by using a mobile printing application installed in a mobile device, user convenience may be improved.

As described above, in some cases, firmware of the MFP needs to be updated to set a Wi-Fi Direct connection between the mobile device and the MFP via NFC tagging. For example, since a method in which an encrypted PIN is stored in an NFC tag attached to an MFP and a mobile device receives the PIN stored in the NFC tag when NFC tagging is performed and automatically transmits the PIN to the MFP so as to request a Wi-Fi Direct connection does not follow the Wi-Fi Direct standards, for the above-described method, firmware of the MFP should be updated. A method of updating firmware will now be described in detail.

Figure 14:
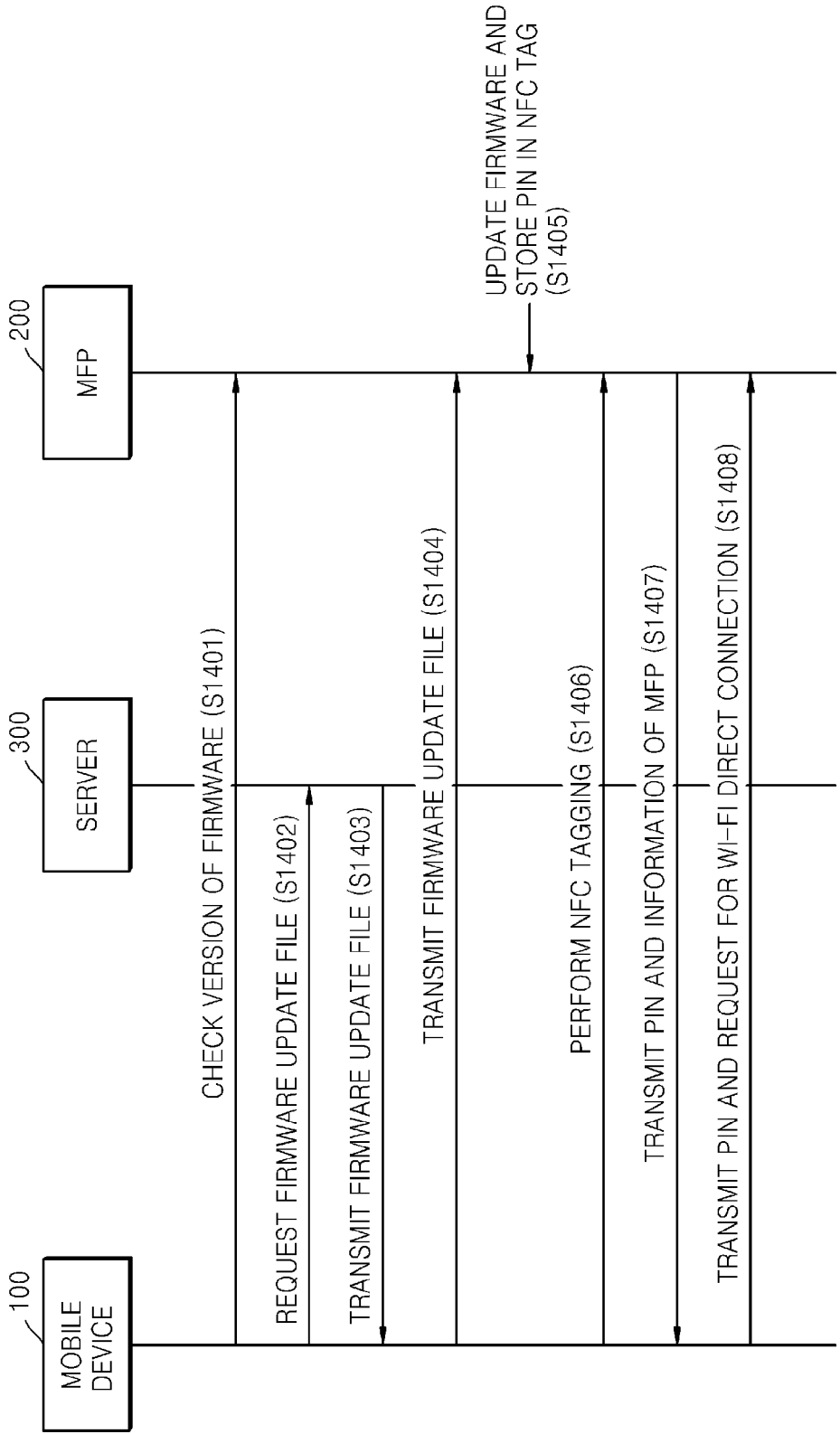
FIGS. 14 and 15 are diagrams showing processes of updating firmware of an MFP in a system to provide mobile printing using NFC, according to embodiments of the present general inventive concept.

FIG. 14 is a diagram showing a process of updating firmware of an MFP 200 in a system for mobile printing using NFC, according to an embodiment of the present general inventive concept. As illustrated in FIG. 14, the system according to the current embodiment may further include a server 300 to update the firmware of the MFP 200.

Referring to FIG. 14, a mobile device 100 checks a version of the firmware of the MFP 200 (operation S1401). In this case, in order to allow the mobile device 100 to check the version of the firmware of the MFP 200, the mobile device 100 and the MFP 200 may be connected by a cable via universal serial bus (USB) ports, or may be connected via Wi-Fi Direct according to an existing method in which a user manually inputs a PIN to the MFP 200. The mobile device 100 checks whether the version of the firmware of the MFP 200 supports Wi-Fi Direct connection via automatic transmission of a PIN.

If the version of the firmware of the MFP 200 supports Wi-Fi Direct connection via automatic transmission of a PIN, the firmware does not need to be updated. However, if the version of the firmware of the MFP 200 does not support Wi-Fi Direct connection via automatic transmission of a PIN, the firmware should be updated, and thus the mobile device 100 requests the server 300 for a firmware update file (operation S1402). The server 300 receives the request and transmits the firmware update file to the mobile device 100 (operation S1403), and the mobile device 100 transmits the received firmware update file to the MFP 200 (operation S1404).

The MFP 200 receives the firmware update file and updates the firmware, and a PIN is encrypted and stored in an NFC tag attached to the MFP 200 (operation S1405). In this case, the PIN may be stored in the NFC tag in various ways. For example, the user may check the PIN set to the MFP 200 by using a "Print Report" function of the MFP 200, and may store the checked PIN value in the NFC tag. Alternatively, the user may store a desired PIN value in the NFC tag and the PIN value of the MFP 200 may be changed to correspond to the stored PIN value. In this case, for security's sake, the PIN is encrypted before being stored in the NFC tag.

If the mobile device 100 is NFC-tagged on the MFP 200 after the firmware is updated and the PIN is stored in the NFC tag (operation S1406), an NFC module of the mobile device 100 receives information about the MFP 200, for example, a MAC address, a device name, and a PIN of the MFP 200, from the NFC tag attached to the MFP 200 (operation S1407). Then, the mobile device 100 transmits to the MFP 200 the PIN and a request for a Wi-Fi Direct connection by using the received information of the MFP 200 (operation S1408). Since the updated firmware of the MFP 200 supports Wi-Fi Direct connection via automatic transmission of a PIN, the PIN received from the mobile device 100 is compared to the PIN set to the MFP 200 and, if the PINs are identical, the Wi-Fi Direct connection is accepted.

Figure 15:
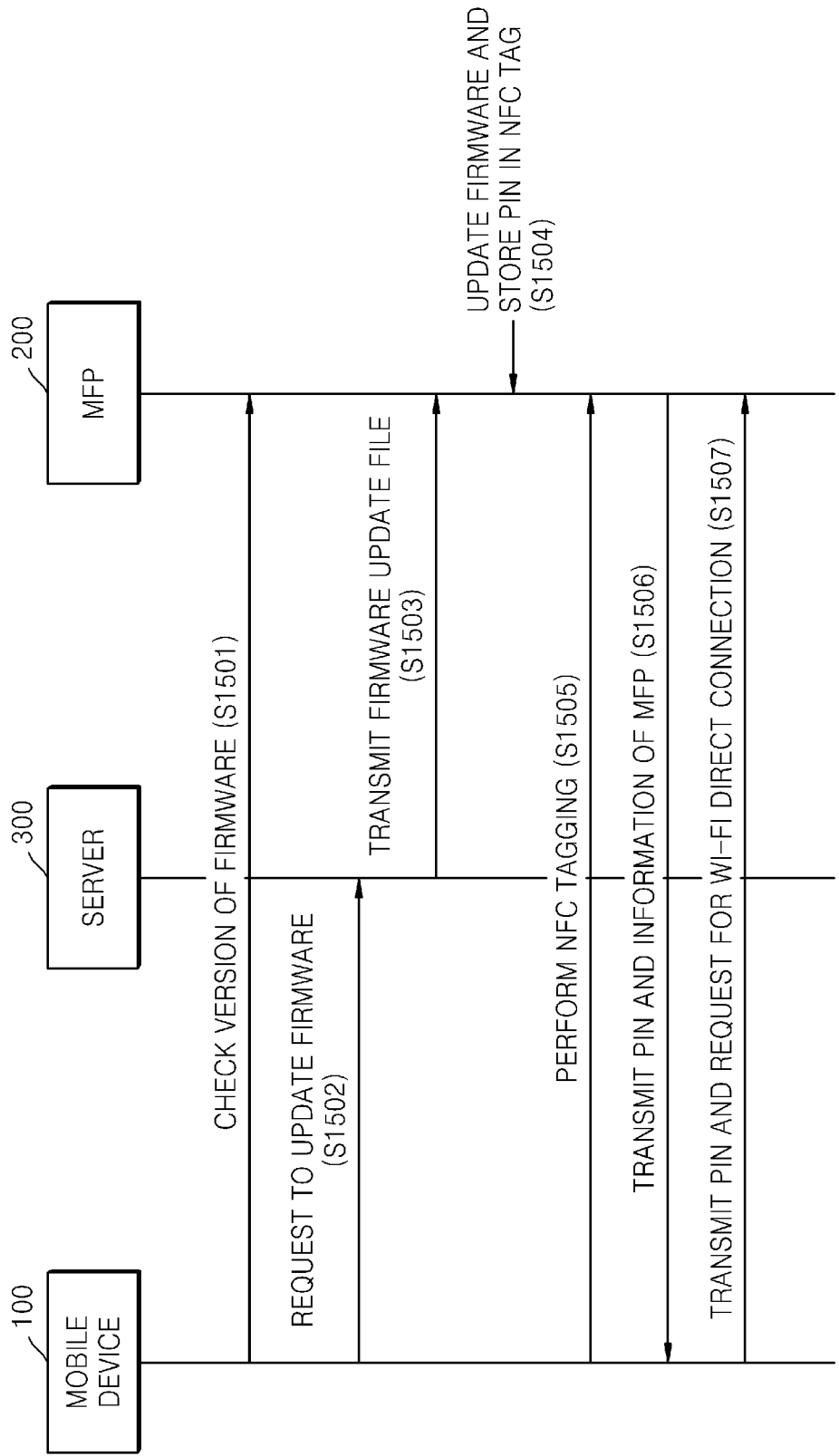

Although the mobile device 100 receives the firmware update file from the server 300 and then transmits the firmware update file to the MFP 200 according to the firmware update method of FIG. 14, as illustrated in FIG. 15, the mobile device 100 may not receive the firmware update file, but may push the server 300 to transmit the firmware update file directly to the MFP 200. Referring to FIG. 15, if the mobile device 100 requests the server 300 to update the firmware (operation S1502), the server 300 transmits a firmware update file directly to the MFP 200 instead of the mobile device 100 (S1503). The other operations of FIG. 15 are the same as those of FIG. 14, and thus detailed descriptions thereof are not provided here.

Unlike the above embodiments of FIGS. 14 and 15, a mobile device may not be involved and an MFP itself may compare a version of installed firmware to the latest version of firmware stored in a server and, if the versions are not identical, may request the server for a firmware update file so as to update the firmware.

Figure 16:
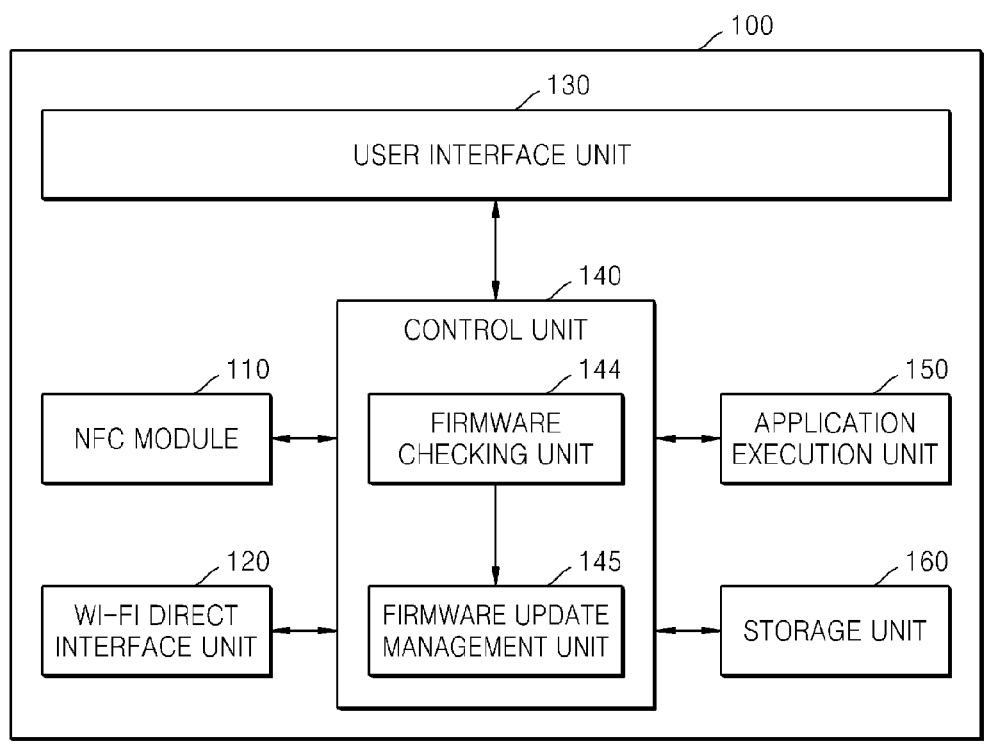
FIG. 16 is a diagram showing a hardware configuration of a mobile device, according to another embodiment of the present general inventive concept.

FIG. 16 is a diagram showing a hardware configuration of a mobile device, according to another embodiment of the present general inventive concept. The mobile device 100 of FIG. 16 may include an NFC module 110, a Wi-Fi Direct interface unit 120, a user interface unit 130, a control unit 140, an application execution unit 150, and a storage unit 160. From among them, the control unit 140 may include a firmware checking unit 144 and a firmware update management unit 145.

The elements other than the firmware checking unit 144 and the firmware update management unit 145 are the same as those illustrated in FIG. 8, and only the firmware checking unit 144 and the firmware update management unit 145 will be described in detailed here.

The firmware checking unit 144 checks whether a version of firmware of an MFP supports Wi-Fi Direct connection via automatic transmission of a PIN. In this case, in order to allow the firmware checking unit 144 included in the mobile device 100 to check the version of the firmware of the MFP, a connection for data transmission and reception should be set between the mobile device 100 and the MFP. Accordingly, while USB ports of the mobile device 100 and the MFP may be connected by a cable, the firmware checking unit 144 may check the version of the firmware of the MFP. Here, other wire or wireless connection methods may also be used. The firmware checking unit 144 transmits a checking result to the firmware update management unit 145.

If the checked version of the firmware of the MFP supports Wi-Fi Direct connection via automatic transmission of a PIN, the firmware does not need to be updated, and thus the firmware update management unit 145 does not perform any operation. However, if the checked version of the firmware of the MFP does not support Wi-Fi Direct connection via automatic transmission of a PIN, the firmware of the MFP is updated. In other words, the firmware update management unit 145 requests a server for a firmware update file, receives the firmware update file, and transmits the received firmware update file to the MFP. Alternatively, the firmware update management unit 145 may not receive the firmware update file from the server, but may request the server to transmit the firmware update file directly to the MFP.

Figure 17:
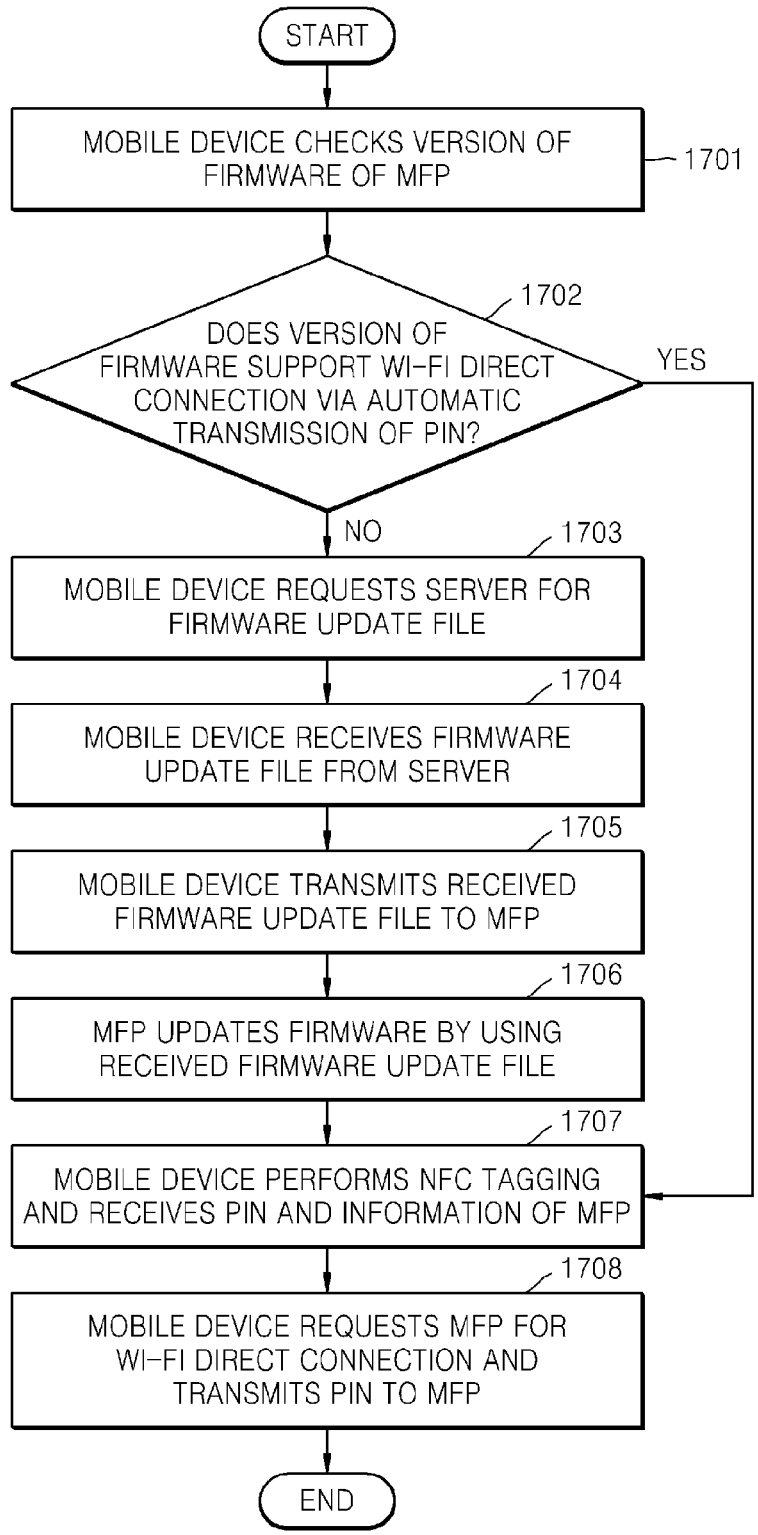
FIGS. 17 and 18 are flowcharts of methods of updating firmware of an MFP in a system to provide mobile printing using NFC, according to embodiments of the present general inventive concept.
Figure 18:
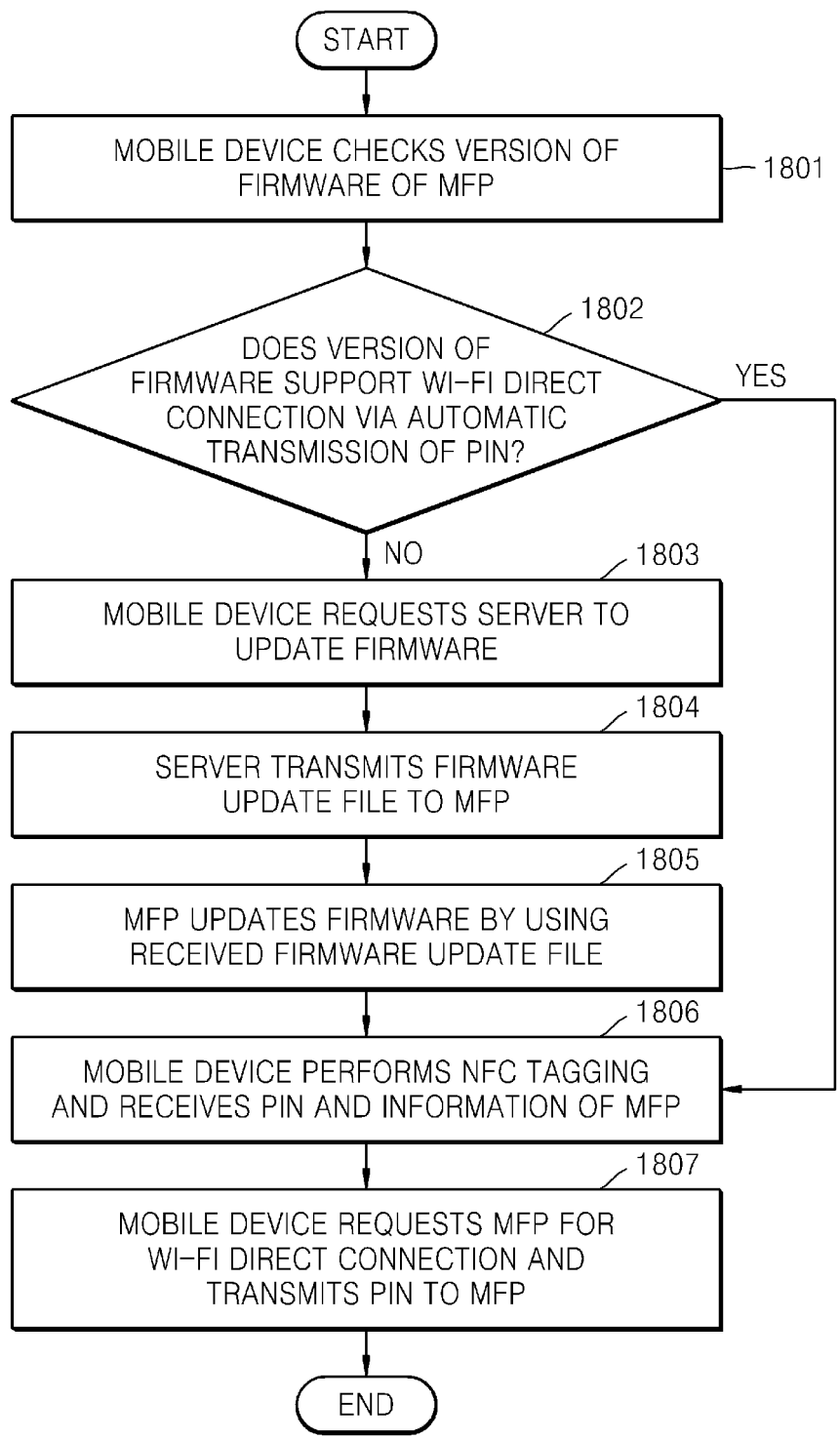

FIGS. 17 and 18 are flowcharts of methods of updating firmware of an MFP in a system for mobile printing using NFC, according to embodiments of the present general inventive concept.

Referring to FIG. 17, a version of firmware installed in an MFP is checked in operation 1701, and it is determined whether the version of the firmware supports Wi-Fi Direct connection via automatic transmission of a PIN, in operation 1702. If the version supports Wi-Fi Direct connection via automatic transmission of a PIN, the method proceeds to operation 1707. Otherwise, the method proceeds to operation 1703. A mobile device requests a server for a firmware update file in operation 1703, and receives the firmware update file from the server in operation 1704. The mobile device transmits the received firmware update file to the MFP in operation 1705. The MFP updates the firmware by using the firmware update file received from the mobile device, in operation 1706. In this case, when the firmware is updated, a PIN is encrypted and stored in an NFC tag attached to the MFP.

If the firmware of the MFP is completely updated to a version that supports Wi-Fi Direct connection via automatic transmission of a PIN, when the mobile device is NFC-tagged on the MFP, the mobile device receives from the NFC tag the PIN together with information about the MFP, for example, a MAC address and a device name of the MFP, in operation 1707. The mobile device requests the MFP for a Wi-Fi Direct connection by using the received information of the MFP, and transmits the received PIN to the MFP, in operation 1708. If the Wi-Fi Direct connection is requested, the MFP determines whether the PIN transmitted from the mobile device is identical to the PIN set to the MFP and, if the PINs are identical, accepts the Wi-Fi Direct connection.

Although the mobile device receives the firmware update file from the server and then transmits the firmware update file to the MFP in the firmware update method of FIG. 17, as illustrated in FIG. 18, the mobile device may merely push the server to transmit the firmware update file directly to the MFP.

Referring to FIG. 18, a version of firmware installed in an MFP is checked in operation 1801, and it is determined whether the version of the firmware supports Wi-Fi Direct connection via automatic transmission of a PIN, in operation 1802. If the version supports Wi-Fi Direct connection via automatic transmission of a PIN, the method proceeds to operation 1806. Otherwise, the method proceeds to operation 1803. If a mobile device requests a server to update the firmware in operation 1803, the server transmits a firmware update file directly to the MFP in operation 1804. The MFP updates the firmware by using the firmware update file received from the server, in operation 1805. In this case, when the firmware is updated, a PIN is encrypted and stored in an NFC tag attached to the MFP.

If the firmware of the MFP is completely updated to a version that supports Wi-Fi Direct connection via automatic transmission of a PIN, when the mobile device is NFC-tagged on the MFP, the mobile device receives from the NFC tag the PIN together with information about the MFP, for example, a MAC address and a device name of the MFP, in operation 1806. The mobile device requests the MFP for a Wi-Fi Direct connection by using the received information of the MFP, and transmits the received PIN to the MFP, in operation 1807. If the Wi-Fi Direct connection is requested, the MFP determines whether the PIN transmitted from the mobile device is identical to the PIN set to the MFP and, if the PINs are identical, accepts the Wi-Fi Direct connection.

As such, by updating firmware of an MFP, a Wi-Fi Direct connection may be automatically set between a mobile device and the MFP without requiring a user to manually input a PIN.

As described above, a user may easily perform mobile printing by merely performing NFC tagging. Also, information about an MFP may be checked and various settings of the MFP may be managed by using a mobile printing application executed on a mobile device.

While the present general inventive concept has been particularly shown and described with reference to exemplary embodiments thereof, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the inventive concept but by the following claims, and all differences within the scope will be construed as being included in the present general inventive concept.

What is claimed is:

1. A method of mobile printing using near field communication (NFC), the method comprising:
   determining whether firmware installed on an image forming apparatus supports a connection based on a personal identification number (PIN);
   updating the firmware installed in the image forming apparatus when the checked version of the firmware does not support a connection based on the PIN;
   encrypting and storing the PIN in an NFC tag attached to the image forming apparatus automatically in response to the update of the firmware;
   setting the connection by receiving the stored PIN and automatically transmitting the PIN to the image forming apparatus by the mobile device when the mobile device is NFC-tagged to the image forming apparatus.

2. The method of claim 1,
   wherein the connection is a Wi-Fi Direct connection, and wherein the setting of the connection comprises:
   receiving, by the mobile device, a media access control (MAC) address of the image forming apparatus and the stored PIN by approaching the NFC tag;
   searching, by the mobile device, for an apparatus corresponding to the MAC address;
   transmitting, by the mobile device, a Wi-Fi Direct connection request and the stored PIN to the image forming apparatus if the image forming apparatus is found; and
   authenticating, by the image forming apparatus, the PIN received from the mobile device, and accepting the Wi-Fi Direct connection request if the PIN is successfully authenticated.

3. The method of claim 1, wherein the updating of the firmware comprises:
   requesting, by the mobile device, a server for a firmware update file;
   receiving, by the mobile device, the firmware update file from the server and transmitting the firmware update file to the image forming apparatus; and
   receiving, by the image forming apparatus, the firmware update file from the mobile device and updating the firmware.

4. The method of claim 1, wherein the updating of the firmware comprises:
   requesting, by the mobile device, a server to transmit a firmware update file directly to the image forming apparatus; and
   receiving, by the image forming apparatus, the firmware update file from the server and updating the firmware.

5. The method of claim 1, wherein the checking of the version of the firmware comprises:
   connecting the mobile device and the image forming apparatus by using a cable; and
   checking, by the mobile device, the version of the firmware of the image forming apparatus.

6. The method of claim 1,
   wherein the checking of the version of the firmware comprises checking, by the image forming apparatus, the version of the firmware installed periodically,
   wherein the determining comprises comparing, by the image forming apparatus, the checked version of the firmware to the version of the firmware stored in a server, and
   wherein the updating comprises, receiving, by the image forming apparatus, a firmware update file from the server and updating the firmware when the checked version of the firmware is not identical to the version of the firmware stored in the server.

7. The method of claim 1, wherein the encrypting and storing of the PIN comprises receiving a preset PIN of the image forming apparatus from a user, and encrypting and storing the received PIN.

8. The method of claim 1, wherein the encrypting and storing of the PIN comprises:
   receiving an arbitrary PIN from a user, and encrypting and storing the received PIN; and
   setting the stored PIN as a PIN corresponding to the image forming apparatus.

9. A non-transitory computer-readable recording medium having recorded thereon a computer program for executing the method of claim 1.

10. The method of claim 1, further comprising:
    performing mobile printing via a Wi-Fi Direct connection.

11. A system for mobile printing using near field communication (NFC), the system comprising:
    a mobile device comprising an NFC module;
    an image forming apparatus configured to set a connection to the mobile device via NFC tagging; and
    a server configured to provide a firmware update file for firmware installed in the image forming apparatus,
    wherein, if a version of the firmware installed in the image forming apparatus does not support the connection based on a personal identification number (PIN), the firmware of the image forming apparatus is updated by using the firmware update file provided by the server, and the PIN is encrypted and stored in an NFC tag attached to the image forming apparatus automatically in response to the update of the firmware.

12. The system of claim 11,
    wherein the connection is a Wi-Fi Direct connection,
    wherein the mobile device approaches the NFC tag, receives a media access control (MAC) address of the image forming apparatus and the stored PIN, searches for an image forming apparatus corresponding to the MAC address, and transmits a Wi-Fi Direct connection request and the stored PIN to the searched image forming apparatus, and
    wherein the image forming apparatus authenticates the PIN received from the mobile device, and accepts the Wi-Fi Direct connection request if the PIN is successfully authenticated.

13. The system of claim 11,
    wherein the mobile device receives the firmware update file from the server and transmits the firmware update file to the image forming apparatus, and
    wherein the image forming apparatus receives the firmware update file from the mobile device and updates the firmware.

14. The system of claim 11,
    wherein, if the mobile device requests the server to update the firmware, the server transmits the firmware update file directly to the image forming apparatus, and wherein the image forming apparatus receives the firmware update file from the server and updates the firmware.

15. The system of claim 11,
wherein the mobile device and the image forming apparatus are connected by a cable, and
wherein the mobile device checks the version of the firmware of the image forming apparatus.

16. The system of claim 11, wherein the image forming apparatus checks the version of the firmware installed in the image forming apparatus periodically, compares the checked version of the firmware to the version of the firmware stored in the server, and, if the checked version of the firmware is not identical to the version of the firmware stored in the server, receives the firmware update file from the server and updates the firmware.

17. The system of claim 11, wherein a preset PIN corresponding to the image forming apparatus is encrypted and stored in the NFC tag attached to the image forming apparatus.

18. The system of claim 11,
wherein an arbitrary PIN is encrypted and stored in the NFC tag attached to the image forming apparatus, and
wherein the stored PIN is set as a PIN corresponding to the image forming apparatus.

19. A method of mobile printing using near field communication (NFC), the method comprising:
updating firmware installed in a multi-function peripheral (MFP) when it is determined that the version of the firmware does not support a connection based on a personal identification number (PIN);
storing the PIN in an NFC tag of the MFP automatically in response to the update of the firmware;
receiving information about the MFP including the stored PIN by NFC tagging the MFP; and
requesting the MFP for the connection and transmitting the PIN received from the MFP during an NFC tagging operation to the MFP.

20. The method of claim 19,
wherein the connection is a Wi-Fi Direct connection, and
wherein the determination whether the version of the firmware stored in the MFP supports Wi-Fi Direct connection via automatic transmission of a PIN and the requesting the MFP for Wi-Fi Direct connection and transmitting a PIN received from the MFP during an NFC tagging operation to the MFP are performed via a USB or other wired connection to the MFP.

21. The method of claim 19, wherein the determination whether the version of the firmware stored in the MFP supports Wi-Fi Direct connection via automatic transmission of a PIN and the requesting the MFP for Wi-Fi Direct connection and transmitting a PIN received from the MFP during an NFC tagging operation to the MFP are performed via a type of wireless connection to the MFP.

22. The method of claim 19, wherein the updating of the firmware is performed by receiving the firmware update file from a server and then transmitting the firmware update file to the MFP.

23. The method of claim 19, wherein the updating of the firmware is performed by pushing a server to transmit the firmware update file directly to the MFP.

* * * * *